United States Patent  
Wu et al.

(10) Patent No.: US 12,542,135 B2
(45) Date of Patent: Feb. 3, 2026

(54) FACTORIZED NEURAL TRANSDUCER FOR MULTI-SPEAKER SPEECH RECOGNITION

(71) Applicant: MICROSOFT TECHNOLOGY LICENSING, LLC, Redmond, WA (US)

(72) Inventors: Jian Wu, Bellevue, WA (US); Jinyu Li, Bellevue, WA (US); Zhuo Chen, Woodinville, WA (US); Naoyuki Kanda, Bellevue, WA (US); Takuya Yoshioka, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 18/207,625

(22) Filed: Jun. 8, 2023

(65) Prior Publication Data

US 2024/0412736 A1 Dec. 12, 2024

(51) Int. Cl.
*G10L 17/18* (2013.01)
*G10L 17/02* (2013.01)
*G10L 17/04* (2013.01)
*G10L 17/14* (2013.01)
*G10L 25/78* (2013.01)

(52) U.S. Cl.
CPC .............. *G10L 17/18* (2013.01); *G10L 17/02* (2013.01); *G10L 17/04* (2013.01); *G10L 17/14* (2013.01); *G10L 25/78* (2013.01)

(58) Field of Classification Search
CPC ......... G10L 17/18; G10L 17/02; G10L 17/04; G10L 17/14; G10L 25/78
See application file for complete search history.

(56) References Cited

U.S. PATENT DOCUMENTS

2023/0298566 A1* 9/2023 Li ........................... G10L 15/16
704/232

OTHER PUBLICATIONS

Chen et al. (Year: 2021).*
Kanda (Year: 2022).*
Kanda2 (Year: 2022).*
Schomacker and Tropmann-Frick (Year: 2021).*
Chen et al. ("Factorized neural transducer for efficient language model adaptation." arXiv preprint arXiv:2110.01500 version 1 (Sep. 27, 2021)) (Year: 2021).*
Kanda et al. ( "Streaming speaker-attributed ASR with token-level speaker embeddings." arXiv preprint arXiv:2203.1668 version 1 (Mar. 30, 2022)) (Year: 2022).*
Schomacker, T., & Tropmann-Frick, M. (2021). Language Representation Models: An Overview. Entropy, 23(11), 1422. https://doi.org/10.3390/e23111422) (Year: 2021).*

(Continued)

*Primary Examiner* — Bhavesh M Mehta
*Assistant Examiner* — Joseph J. Yamamoto
(74) *Attorney, Agent, or Firm* — Workman Nydegger

(57) ABSTRACT

Systems and methods are provided for instantiating, modifying, adapting, and using a factorized neural transducer for multi-speaker automatic speech recognition. The factorized neural transducer includes a vocabulary predictor with multiple hidden states to process speech from different speakers, a non-vocabulary predictor that facilitates the prediction of channel change tokens indicating a speaker change in input speech data, an encoder used to encode acoustic features of the input speech data, and a joint network.

19 Claims, 16 Drawing Sheets

(56) References Cited

OTHER PUBLICATIONS

Kanda, Naoyuki, et al. "Streaming multi-talker ASR with token-level serialized output training." arXiv preprint arXiv:2202.00842 version 1 (Feb. 2, 2022) (Year: 2022).*

International Search Report and Written Opinion received for PCT Application No. PCT/US2024/030900 (MS#413119-PCT01), Jul. 12, 2024, 17 pages.

Kanda, et al., "Streaming Speaker-Attributed ASR with Token-Level Speaker Embeddings", arXiv preprint arXiv:2203.16685, Jul. 14, 2022, 05 pages.

Wu, et al., "Speaker Change Detection For Transformer Transducer ASR", IEEE International Conference on Acoustics, Speech and Signal Processing (ICASSP), Jun. 4, 2023, 05 pages.

Wu, et al., "T-SOT FNT: Streaming Multi-Talker ASR with Text-Only Domain Adaptation Capability", IEEE International Conference on Acoustics, Speech and Signal Processing (ICASSP), Apr. 14, 2024, pp. 11531-11535.

International Preliminary Report on Patentability (Chapter I) received for PCT Application No. PCT/US2024/030900, mailed on Dec. 18, 2025, 12 pages.

* cited by examiner

FACTORIZED NEURAL TRANSDUCER FOR MULTI-SPEAKER SPEECH RECOGNITION

BACKGROUND

Automatic speech recognition (ASR) systems and other speech processing systems are used to process and decode audio data to detect speech utterances (e.g., words, phrases, and/or sentences). The processed audio data is then used in various downstream tasks such as search-based queries, speech-to-text transcription, language translation, etc. There are many different types of ASR systems, including end-to-end (E2E) ASR systems, connectionist temporal classification (CTC) systems, attention-based encoder-decoder systems, and ASR transducers. Each of these systems transforms acoustic features into text sequences.

However, one of the main challenges of conventional transducer-based ASR systems is that the ASR system must be adapted using robust adaptation data comprising speech data with corresponding speech labels. This is computationally and time expensive to collect new audio data for the new domain and generate corresponding speech labels.

In some instances, the ASR system must also be adapted for a new domain and trained in a general baseline domain. When the ASR system is adapted to a new domain, the ASR system decreases in accuracy for performing speech recognition in the baseline domain, even though it has realized an improvement in accuracy for recognizing speech in the new domain. These problems are magnified even further when the speech data processed by the ASR system, particularly the training data, includes speech from multiple speakers.

In view of the foregoing, there is a need for improved methods and systems for adapting an ASR system to a new domain and performing automatic speech recognition using the adapted ASR system for multi-speaker speech recognition.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Disclosed embodiments include systems and methods for generating, modifying, and using a machine learning model, such as a factorized neural transducer, to improve the accuracy of the machine learning model, particularly in performing multi-speaker speech recognition. Disclosed embodiments also include systems and methods for adapting a machine-learning model to a new domain.

The disclosed machine-learning model is used by a computing system to perform run-time automatic speech recognition on multi-speaker speech. This is done through a set of processing layers configured to access input speech data, process the input speech data, and predict vocabulary tokens and non-vocabulary tokens for the input speech data.

In some instances, a set of acoustic features is extracted from input speech data. This set of acoustic features is then encoded to generate an encoded acoustic output. Vocabulary tokens and non-vocabulary tokens (e.g., a previous channel change token) are also transmitted as combined input into the set of processing layers to generate a vocabulary predictor output.

When the system recognizes a previous channel change token in the combined input, the system switches from processing new input data using a first hidden state of the set of processing layers to using a second hidden state of the set of processing layers. The previous vocabulary token is then processed using the second hidden state. Based on processing the previous vocabulary token, a vocabulary predictor output is generated by causing the set of processing layers to process the previous vocabulary token using the second hidden state. A new vocabulary token is then generated for the input speech data based on a combination of the encoded acoustic output and the vocabulary predictor output.

Some disclosed embodiments also include the generation of a factorized neural transducer for performing automatic speech recognition on overlapping speech from multiple speakers. The factorized neural transducer can be generated, for example, by providing a first set of instructions for instantiating a vocabulary predictor that generates intermediary vocabulary outputs for input speech data based on previously generated outputs of the factorized neural transducer, wherein the vocabulary predictor includes a first hidden state and a second hidden state.

The generation of the factorized neural transducer also includes providing a second set of instructions for instantiating an encoder that processes acoustic features extracted from the input speech data and that generates encoder outputs based on the acoustic features.

The generation of the factorized neural transducer also includes providing a third set of instructions for instantiating one or more transducer layers that process the intermediary vocabulary outputs and the encoder outputs in order to predict vocabulary tokens for the input speech data. Finally, each set of the foregoing instructions is transmitted to a computing system to cause the computing system to generate the factorized neural transducer by instantiating the vocabulary predictor, the encoder, and the one or more transducer layers as part of the factorized neural transducer.

Disclosed embodiments are also used for modifying a factorized neural transducer to perform multi-speaker automatic speech recognition in a new domain. For example, systems can access a factorized neural transducer that includes a vocabulary predictor, an encoder, and a non-vocabulary predictor. The systems also access serialized transcription data that includes overlapping speech transcription data from multiple speakers for the new domain or single speaker transcription data. Then, the systems modify the factorized neural transducer by adapting the vocabulary predictor of the factorized neural transducer. This occurs, for example, when the system applies the factorized neural transducer to the serialized transcription data corresponding to the new domain. In particular, some portions of the serialized transcription data are processed using the first hidden state of the vocabulary predictor while other portions of the serialized transcription data are processed using the second hidden state of the vocabulary predictor. In some instances, systems only access single-speaker transcription data for the text-only adaptation task as the data is easier to obtain. This single-speaker transcription data is utilized during adaptation, such that both the performance of the single-talker speech recognition and multi-talker speech recognition achieve improved accuracy of the speech recognition and decrease word error rate (WER) over conventional systems.

Different portions of the serialized transcription data are processed using different hidden states based on the identification of channel change tokens included in the serialized transcription data. During this modification/training process, a vocabulary predictor training loss is generated for the vocabulary predictor. Subsequently, one or more layers of the vocabulary predictor are modified to minimize the vocabulary predictor training loss. By minimizing the vocabulary predictor training loss, the factorized neural transducer is adapted to the new domain without comprising speech recognition accuracy in the new domain or the baseline domain.

This Summary is provided to introduce a selection of concepts that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS AND REFERENCE TO APPENDIX

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be limiting in scope, embodiments will be described and explained with additional specificity and detail through the use of the accompanying drawings in which.

DETAILED DESCRIPTION

Figure 1:
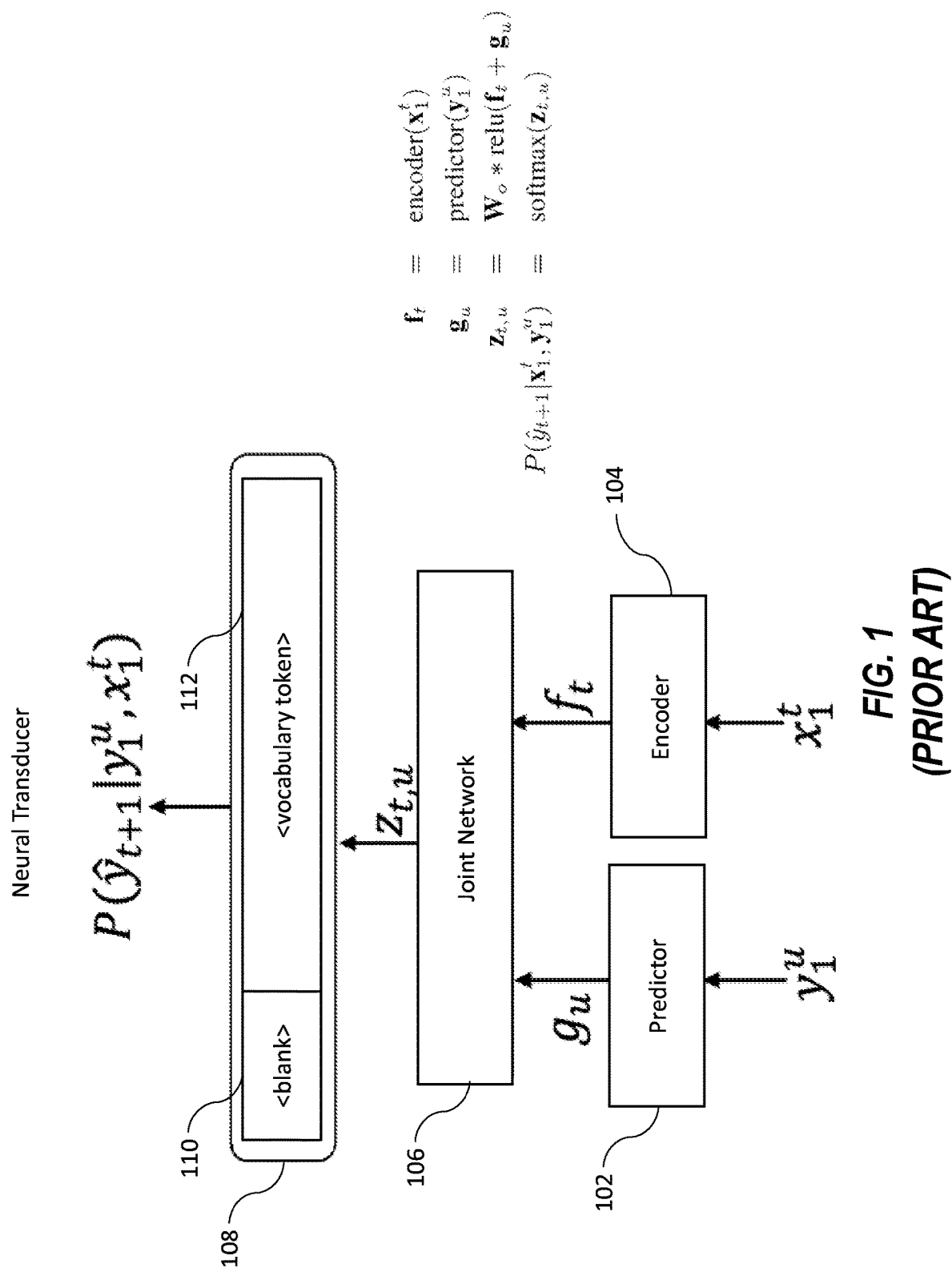
FIG. 1 illustrates an example embodiment of a conventional neural transducer.

Disclosed embodiments include or may be used for generating, modifying, and using a machine learning model, such as a factorized neural transducer, to improve the accuracy of the machine learning model, particularly in performing multi-speaker speech recognition. Disclosed embodiments also include systems and methods for adapting a machine-learning model to a new domain.

The disclosed embodiments may be utilized to realize many technical benefits and advantages over conventional systems and methods for performing speech recognition, as well as for generating and modifying machine learning models that are capable of performing multi-speaker speech recognition. The technical benefits and advantages that may be realized, for example, include the ability to process overlapping speech from multiple speakers within the same audio stream.

As described herein, various embodiments are provided for further modifying factorized neural transducers to obtain even greater accuracy when performing ASR tasks. The disclosed additional modifications that can be made to the factorized neural transducers include but are not limited to instantiating at least two hidden states associated with the vocabulary predictor of the factorized neural transducer. By providing at least two hidden states within the vocabulary predictor, overlapping speech data from different speakers or channels can be processed using the different hidden states to improve the accuracy of performing multi-speaker speech recognition for each speaker. By processing the overlapping multi-speaker speech data, systems are able to isolate speech from each speaker and output vocabulary tokens that leverage the previously predicted vocabulary tokens corresponding to each speaker.

This process also generates factorized neural transducer output in a correct grammatical format. For example, previous versions of factorized neural transducers, when presented with serialized transcription data including multi-speaker speech, would break the neural order of the sentences corresponding to each individual speaker. The structure of the new model includes four main components: an acoustic encoder, a decoder for regular ASR units (e.g., vocabulary tokens), a decoder for specialized ASR units (e.g., blank tokens and channel change tokens), and a joint network for the specialized ASR units. The outputs of the joint network and distributions of the regular ASR units are concatenated to produce a final probability distribution over both the regular and specialized units.

The behavior of the decoder for ASR units is improved for multi-speaker speech data. This decoder is referred to as a vocabulary predictor herein. The vocabulary predictor comprises a set of processing layers configured to receive inputs and generate vocabulary predictor outputs. These vocabulary predictor outputs are intermediary outputs that are used in combination with other intermediary outputs (e.g., encoder outputs or non-vocabulary predictor outputs) to predict a vocabulary token for the current input to the factorized neural transducer. This decoder for ASR units can also be referred to as a language model decoder or language model predictor. By implementing a vocabulary predictor in this manner, the vocabulary predictor can still be treated as a language model, while keeping its capability for text-only adaptation, even in multi-speaker scenarios. The foregoing benefits are especially pronounced in ASR applications requiring fast adaptation, such as in real-time and/or streaming audio scenarios because of the vocabulary predictor.

To facilitate an increase in the accuracy of speech recognition, especially for multi-speaker scenarios where some speech from different speakers can be overlapped, the improved decoder (i.e., vocabulary predictor) includes multiple hidden states. In some instances, the hidden state of a machine learning model, like a decoder, is a hidden variable which sequentially stores the previous outputs of the model up to the current time step or processing iteration. Hidden states added are updated based on processing the current input to the model in combination with any data or previously generated outputs that were previously stored in the hidden state prior to receiving the current input.

In some instances, the decoder comprises at least two hidden states maintained and updated for at least two virtual channels. Each time the decoder identifies a channel change token that indicates a speaker change in the input speech data, the decoder will switch to processing new inputs using a different hidden state than a previously used hidden state that was used prior to identifying the channel change token in the current input. When the system is processing the channel change token as the current input, the vocabulary predictor uses the previous output (e.g., previous output of the vocabulary predictor and/or previous output of the factorized neural transducer) as the current output for the input comprising the channel change token. When a channel change token is identified and processed through the factorized neural transducer, the previously used hidden state is not updated or, in some instances, it is updated with a null token.

In some instances, systems predetermine a default hidden state (e.g., a first hidden state) that is used when a new audio dataset or new audio stream is identified as input to the factorized neural transducer. As each token of the audio dataset or audio stream is received and processed sequentially, the first hidden state of the vocabulary predictor is updated based on the current input (e.g., the most recently generated factorized neural transducer output) to the vocabulary predictor and any previous outputs stored in the first hidden state. Once a channel change token is identified in the most recently generated factorized neural transducer output, the system switches from using the first hidden state to process new inputs to the vocabulary predictor to using a second hidden state to process new inputs to the vocabulary predictor. Thus, after identifying a channel change token, the second hidden state of the vocabulary predictor is now updated based on the current input (e.g., most recently generated factorized neural transducer output) and any previous outputs stored in the second hidden state.

By performing speech recognition using a decoder with multiple hidden states, the automatic speech recognition system (including the factorized neural transducer) achieves a significant improvement in the word error rate, as well as in being able to generate a more accurate transcription output for multiple speakers as compared to systems which utilize a single hidden state in the vocabulary predictor.

Conventional Neural Transducers

Attention will first be directed to FIG. 1, which illustrates an example embodiment of a conventional neural transducer configured to perform speech recognition on speech input. As illustrated, the conventional neural transducer comprises a predictor 102, an encoder 104, and a joint network 106.

The predictor takes input (e.g., "y") comprising a previously predicted non-blank output (e.g., historical label sequence) to generate a prediction output (e.g., "g"), which is a label representation. The encoder takes input (e.g., "x") comprising acoustic features associated with a portion of speech data to generate an encoder output (e.g., "f"), which is an acoustic representation. The joint network generates a joint output (e.g., "z") based on the prediction output and the encoder output. The joint output is then used to generate a final prediction 108 for a corresponding portion of speech data, which includes a blank token 110 and vocabulary token 112, which results in a probability distribution over the output layer. Notably, predictor 102 is configured in the conventional model to predict both the blank token 110 as well as the vocabulary token 112, such that the training and results of the two types of potential tokens are tied together.

In order to address the length differences between the acoustic feature and label sequences, a special blank symbol is added to the output vocabulary to represent a null token. Each alignment contains a particular number of output tokens. The objective function of the transducer model is to minimize the negative log probability over all possible alignments.

In recent years, E2E-based automatic speech recognition systems like the neural transducer illustrated in FIG. 1 have achieved success due to their simplicity and promising performance and are able to outperform traditional hybrid models in some scenarios. However, the joint optimization of the acoustic model and lexicon and language model in the neural transducer also brings significant challenges in adapting the ASR system. For example, neural transducers such as those illustrated in FIG. 1 must use adaptation training data that comprises audio-text pairs.

Conventional models, such as those referenced in FIG. 1, are not easily tuned/trained for new domains using only adaptation text. This makes adaptation tasks more costly, both in money spent curating the appropriate dataset and in computational processing, which must use the audio data along with the corresponding textual data to adapt an ASR system for new domains. In particular, conventional models must use the audio-text pairs because there are no individual acoustic and language models in conventional transducer modeling.

Notably, there are no individual acoustic and language models used for performing ASR tasks in the conventional neural transducer space. Additionally, although the predictor of the transducer looks similar to a language model in terms of model structure (i.e., an internal language model could be extracted from the predictor and joint network), it does not perform as a language model because the predictor needs to coordinate with the acoustic encoder closely during the training. Hence, it is not straightforward to utilize text-only data to adapt the model from a source domain to a target domain. This especially limits the ability to perform fast adaptation, for example, because the entire model must be adapted.

Additionally, when a conventional model attempts to adapt its neural transducer to a new domain, it experiences significant degradation in its ability to perform speech recognition in the original domain due to the architecture and weighting applied by the neural transducer to the new domain.

The foregoing drawbacks have hindered the use of neural transducers in many different ASR applications. While there have been some efforts made to mitigate or solve these shortcomings, such approaches have been computationally expensive and are not practical for applications requiring fast adaptation.

Factorized Neural Transducer

In light of the foregoing limitations of conventional neural transducers, some disclosed embodiments are directed to an improved neural transducer which factorizes the blank and vocabulary prediction. This factorization allows for the language model portion (e.g., vocabulary prediction layers) of the factorized neural transducer to be adapted independently from the blank prediction layers. This disentangles the fusion of the language model and acoustic model typically experienced in traditional E2E models (i.e., conventional neural transducers) and allows for efficient language model adaptation and customization. Because the vocabulary prediction layers can be adapted independently, systems implemented with a factorized neural transducer as described herein achieve significantly improved computational efficiency during training and adaptation processes as compared to systems that have to adapt the entire neural transducer and thus run training and adaptation processes that are more computationally expensive. Additionally, systems with a factorized neural transducer that is able to independently train or adapt the vocabulary predictor layers (or non-vocabulary predictor layers) independently also achieve a decrease in the hardware storage needed storing the particular set of layers and training data for training and adaptation.

For example, because the factorized neural transducer has been optimized to allow the vocabulary prediction layers to behave more like a standalone language model, the variety and number of adaptation techniques that can be applied are significantly increased. Additionally, the original benefits of using a transducer model, such as minimizing the negative log probability over all possible alignments of the output tokens are also realized in the factorized neural transducer.

Figure 2:
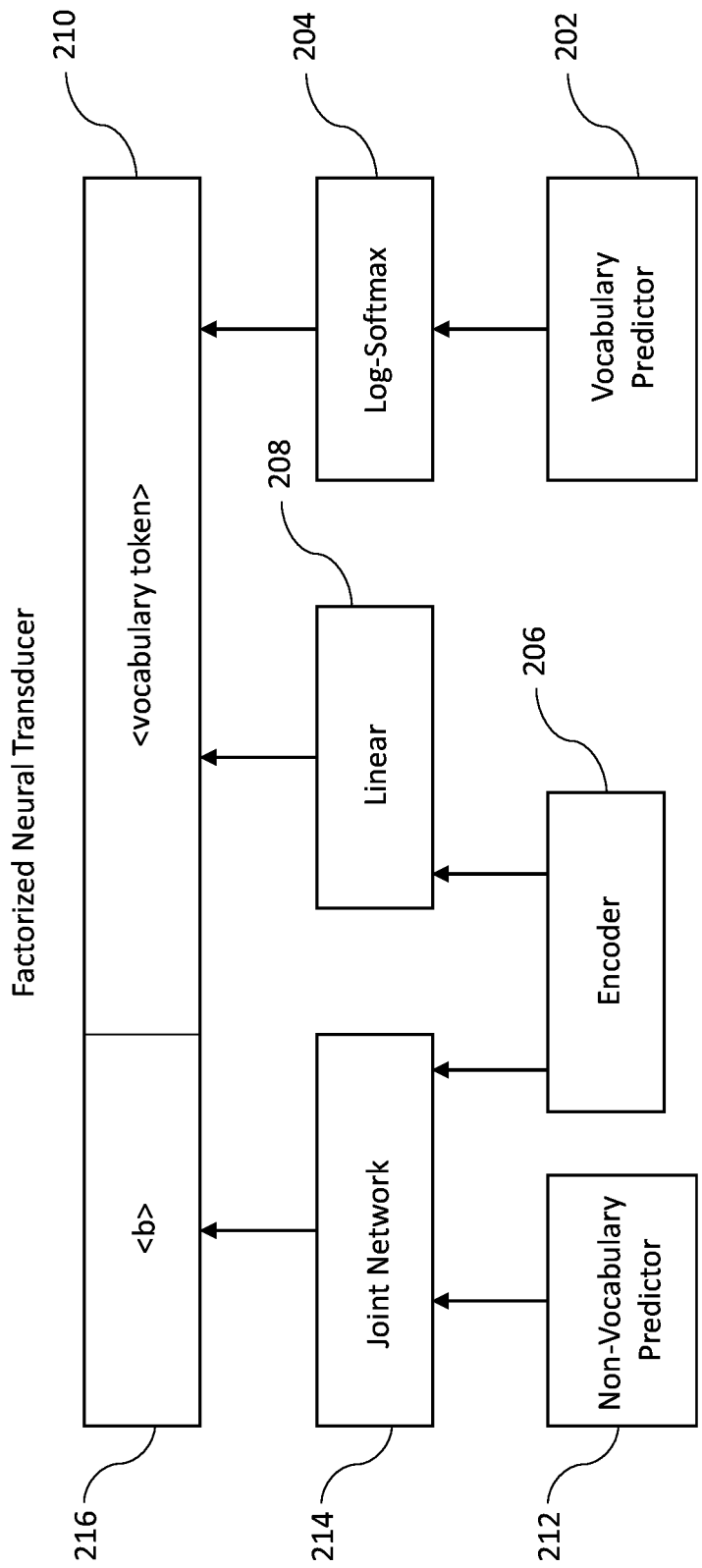
FIG. 2 illustrates an example embodiment of a factorized neural transducer.

Attention will now be directed to FIG. 2, which illustrates an example embodiment of a factorized neural transducer. The factorized neural transducer is configured to predict tokens (e.g., vocabulary and non-vocabulary tokens) for audio data, such as audio streams, comprising speech from one or more speakers. The factorized neural transducer predicts tokens based on a combination of processing a previous factorized neural transducer output and encoding the acoustic features of a current token of the audio stream. It should be appreciated that the factorized neural transducer comprises a first set of processing layers dedicated to predicting non-vocabulary tokens that is separate from a second set of processing layers dedicated to predicting vocabulary tokens.

As illustrated, the factorized neural transducer comprises a blank predictor 212 (e.g., Non-vocabulary Predictor), an encoder 206, a joint network 214, and a vocabulary predictor 202 (e.g., Vocabulary Predictor), which is functionally separated from the blank predictor 212 in the architecture of the factorized neural transducer.

In this factorized architecture, the blank token 216 and vocabulary token 210 are predicted separately, as part of the generation of the label output for input speech data. For example, blank predictor 212 generates a blank predictor output based on receiving a previously predicted non-blank label output and corresponding to a previous portion of speech data.

The encoder 206, meanwhile, generates an encoder output based on receiving a set of acoustic features extracted from a portion of input speech data.

The joint network 214 generates a joint output based on the blank predictor output and the encoder output. The system is then able to predict the blank token 216 based on the joint network output. For the prediction of the blank token, it is important to fuse the acoustic and label information as early as possible, thereby enabling the combination to occur at the joint network. In series, or parallel, with predicting the blank token, the factorized neural transducer also predicts the vocabulary token 210. For example, the vocabulary predictor 202 generates a vocabulary predictor output.

Subsequently, a softmax layer 204 is applied to the vocabulary predictor output in order to generate an additional intermediary vocabulary output. The softmax layer 204 is configured as a multi-class logistic regression that converts a vector of real values into a vector of real values that sums to one. By scoring the input (e.g., vocabulary predictor output) to a zero to one scale, the vocabulary predictor outputs are able to be interpreted as probabilities which is useful in helping the factorized neural transducer in predicting the new vocabulary token. Thus, the softmax layer 204 is a layer that generates a normalized probability distribution of the vocabulary predictor output. It should be appreciated that any layer that facilitates the normalization of the vocabulary predictor outputs can be used instead of the standard softmax layer. Some alternatives to the softmax layer include using a log-softmax loss, a log-Taylor softmax loss, soft-margin softmax, or combination thereof.

An encoder projection layer 208 (e.g., linear layer) is also applied to the encoder output in order to generate an additional encoder output. The system then predicts the vocabulary token 210 based on the outputs from the encoder projection layer 208 and softmax layer 204. Because of the factorization, the vocabulary predictor is allowed to behave like a language model, using historical words (e.g., previously predicted tokens) as input and the log probability of each word as output.

By implementing an ASR system in this manner, it has been found that the factorized neural transducer can achieve 15.4%-to-19.4%-word error rate (WER) improvements, compared to conventional transducer ASR models, when out-of-domain text data is used for language model adaptation. Additionally, the current factorized neural transducer model is able to retain a similar WER as the original training stage on a general test set, with minimal degradation. This is an improvement over conventional models which experience a degradation in accuracy for the general testing set after adaptation to a new domain. Utilizing KL divergence reduces the degradation of the accuracy for the general test set in the factorized neural transducer model.

The system is configured to compute a transducer loss corresponding to the first set of layers which predict the blank token and layers which predict the vocabulary token. The objective function of the transducer model is to minimize the negative log probability over all possible alignments between the acoustic features and label sequences. The system is also configured to compute a language model loss, accounting for cross-entropy, corresponding to the second set of layers that predict the vocabulary token.

The vocabulary prediction network (e.g., the vocabulary predictor, prediction projection layer, and Softmax layer) generates an output that is the log probability over the vocabulary. Because the vocabulary prediction is allowed to function as a standalone language model, this internal language model can be replaced by any language model trained with the same vocabulary. There is no large matrix computation in the factorized neural transducer in the joint network as compared to the traditional neural transducer. As a result, the training speed and memory consumption is improved.

In the training stage, the factorized neural transducer is trained using a loss function. Thereafter, within the adaptation stage, the model can be further trained using any language model adaptation technique to adapt the vocabulary prediction network, including using text-only adaptation data. Implementing systems in this manner results in a technical benefit of increasing the overall efficiency of the training and adaptation processes for the vocabulary prediction network by making it easier to collect a large scale of text data rather than having to collect labeled speech data comprising speech data with corresponding transcriptions. By having a streamlined text-only dataset, systems also achieve improved computational efficiency because less data is needed in order to train or adapt the vocabulary predictor. Additionally, systems achieve a reduction in the amount of storage needed for the training data as compared to systems which need the labeled speech data training datasets.

However, factorized neural transducers having a structure as illustrated in FIG. 2 are not equipped to handle multi-speaker data, nor can they be adapted to a new domain using multi-speaker transcription text data.

Figure 3A:
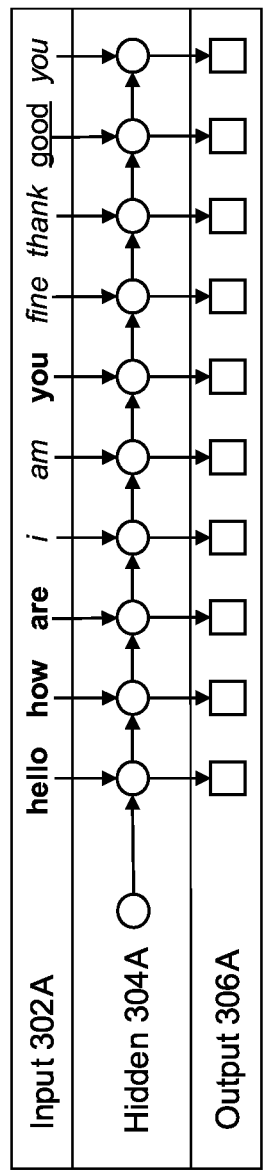
FIGS. 3A and 3B illustrate various examples of processing multi-speaker speech data using a factorized neural transducer, such as the factorized neural transducer of FIG. 2.

Attention will now be directed to FIGS. 3A-3B, which illustrate various examples of how a factorized neural transducer, with a vocabulary predictor having a single hidden state, would process and subsequently break the grammatical structure of multi-speaker speech data during run-time or of multi-speaker transcription data during training. For example, input 302A is shown to include the vocabulary tokens: <hello> <how> <are> </> <am> <you> <fine> <thank> <good> <you>. The bolded tokens represent speech from a first speaker, the italicized tokens represent speech from a second speaker, and the underlined tokens represent speech from a third speaker. For example, in one scenario, a first speaker greeted a second and third speaker: "Hello, how are you?" while the second speaker responded, "I am fine" and the third speaker responded "good." However, as happens in some real-time/real-life scenarios, the second speaker and third speaker may have responded while the first speaker was finishing the greeting, so different portions of speech from each speaker may have been overlapping in the recorded audio stream. The vocabulary predictor relies on at least two inputs, namely the current token being processed, and one or more tokens previously processed using the hidden state 304A. Thus, in some instances, because of the overlapping speech, the current token being processed corresponds to a second speaker while the one or more previous tokens processed using the hidden state 304A may correspond to a first speaker.

This will negatively impact the accuracy of predicting the correct output for the current token. Additionally, the resulting or subsequent output 306A now comprises speech from the different speakers such that the grammatical format is broken for each of the sentences corresponding to the different speakers. Such a transcript would be confusing for a user who may be viewing the transcript during run-time. Additionally, such a transcript would not yield accurate training results for the vocabulary predictor because the vocabulary predictor is trained as a language model which generates vocabulary predictor output based on the standard grammatical structure of the language.

Figure 3B:
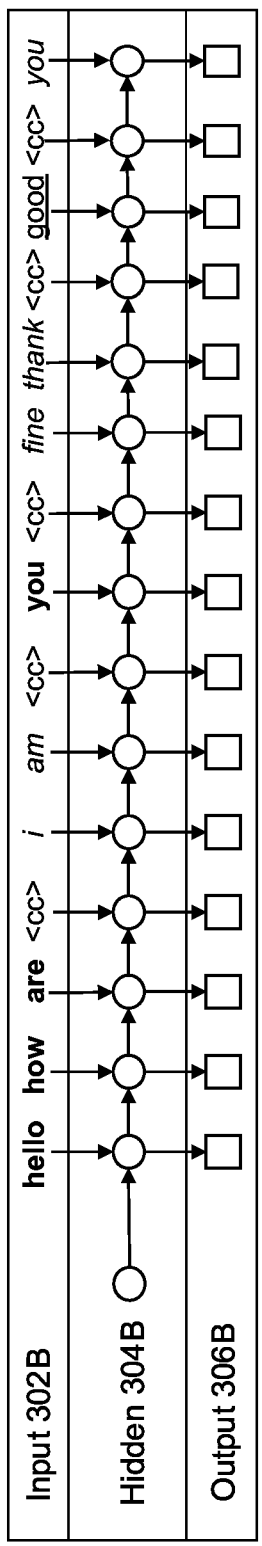

As shown in FIG. 3B, even when input 302B includes channel change tokens, which indicate speaker changes in the token sequence, the output 306B still includes broken and intermixed portions of sentences from each of the speakers because the input 302B is processed using a single hidden state 304B. Thus, this prevents the factorized neural transducer from properly processing multi-speaker speech, especially overlapping multi-speaker speech, either during run-time or during training/adaptation.

Modified Factorized Neural Transducers

Some disclosed embodiments are also directed to further modifications of the factorized neural transducer, which are specifically aimed at optimizing the factorized neural transducer for fast and efficient text-only adaptation in multi-speaker scenarios. In conventional neural transducers, the prediction network does not behave as a standalone language model, which limits its capability in being adapted to new domains. In contrast, by splitting out the language model from the architecture (i.e., factorizing), the factorized neural transducer can be more quickly and efficiently adapted to a new domain because the language model (e.g., vocabulary predictor) can be adapted to a new domain without having to adapt/train model layers associated with predicting the blank token.

Figure 4:
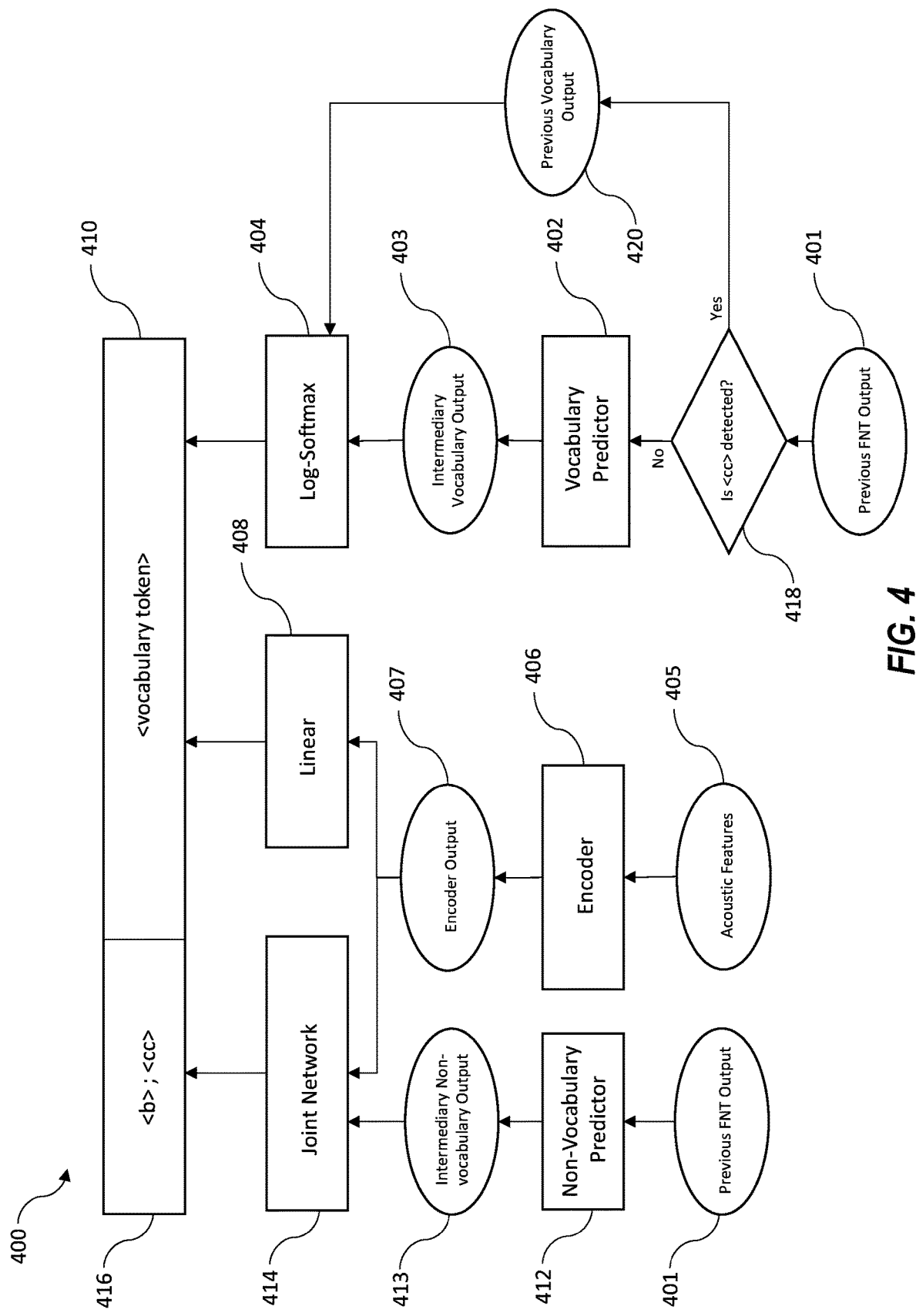
FIG. 4 illustrates an example of a modified factorized neural transducer configured for processing multi-speaker speech data.

Attention will now be directed to FIG. 4, which illustrates an example of a factorized neural transducer that has been modified to improve the training and run-time process of the factorized neural transducer. The modified factorized neural transducer is configured to predict tokens (e.g., vocabulary tokens and non-vocabulary tokens) for input audio data comprising speech from one or more speakers. The tokens are predicted based on processing acoustic features corresponding to a current portion of the audio data received as input to the factorized neural transducer in combination with processing a previous output of the factorized neural transducer. In some instances, the factorized neural transducer encodes the acoustic features prior to predicting either the vocabulary tokens or non-vocabulary tokens. Additionally, the factorized neural transducer also generates intermediary outputs (e.g., vocabulary predictor outputs or non-vocabulary predictor outputs based on processing the previous factorized neural transducer outputs) such that the intermediary outputs are used in combination with the encoded acoustic features to facilitate the prediction of the vocabulary tokens and non-vocabulary tokens. These intermediary outputs refer to any outputs generated within the factorized neural transducer prior to a final factorized neural transducer output (e.g., a vocabulary and/or non-vocabulary token).

Similar to the factorized neural transducer illustrated in FIG. 2, the factorized neural transducer illustrated in FIG. 4, aims to separately predict non-vocabulary tokens and vocabulary tokens, so that the vocabulary predictor for the prediction of vocabulary tokens fully functions as a language model and retains technical benefits associated with this factorized structure. However, several important modifications are shown, including a modification to the vocabulary predictor (e.g., providing at least two hidden states within the vocabulary predictor) and providing a non-vocabulary predictor 412 that is configured to predict channel change tokens, in addition to blank tokens.

As shown in FIG. 4, the factorized neural transducer 400 comprises four main components, including a vocabulary predictor 402, an encoder 406, a non-vocabulary predictor 412, and a joint network 414. Previous factorized neural transducer output 401 is processed by the non-vocabulary predictor 412 which outputs an intermediary non-vocabulary output 413. Acoustic features 405 from new input speech data are processed by the encoder 406 to generate an encoder output 407. The joint network 414 is applied to the intermediary non-vocabulary output 413 and the encoder output 407 in order to predict non-vocabulary tokens 416.

The non-vocabulary tokens may include a channel change token that corresponds to a detected speaker change identified between the previous factorized neural transducer output 401 and the new input speech represented by acoustic features 405. The non-vocabulary tokens may also include a blank token corresponding to a pause (i.e., a pause in speaking or moment of silence within the audio data), a non-verbal sound, such as a background noise, or unrecognizable speech from a speaker, detected in the new input speech.

The previous factorized neural transducer output 401 is provided to the vocabulary predictor 402 as input. The system then determines whether the previous factorized neural transducer output 401 comprises a channel change token (see logic step 418). When a channel change token is detected, the previous vocabulary output 420 is routed to the log-softmax layer 404, bypassing the vocabulary predictor 402.

Additionally, based on identifying a channel change token in the previous factorized neural transducer output, the vocabulary predictor 402 switches between the different hidden states of the vocabulary predictor 402 for processing of subsequently received inputs (e.g., additional previous factorized neural transducer outputs) until another channel change token is detected.

It will be appreciated that while vocabulary predictor 402 is described as having two hidden states, vocabulary predictor 402 can also be modified to include more than two hidden states for the set of processing layers. A separate hidden state may be dedicated to each separate speaker in the serialized transcription. In other embodiments, only two hidden states are used by more than two speakers identified in the serialized transcription.

When no channel change token is detected, the vocabulary predictor 402 generates an intermediary vocabulary output 403, which is subsequently processed by a log-softmax layer 404. The encoder output 407, in addition to being processed by the joint network, is also processed by a linear layer 408. Thus, the linearized encoder output and intermediary vocabulary output 403 processed by the log-softmax layer 404 (or other layer which converts inputs to a normalized probability distribution) are used to predict the vocabulary token 410 for the new input speech, from which the acoustic features 405 were extracted.

Figure 5:
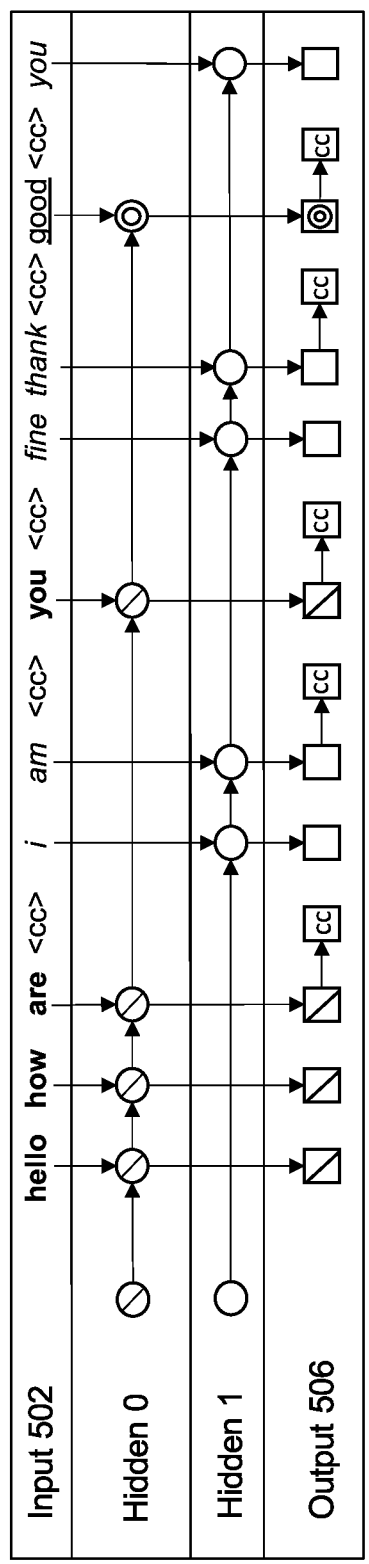
FIG. 5 illustrates an example of processing multi-speaker speech data using a modified neural transducer, such as the factorized neural transducer of FIG. 4.

Attention will now be directed to FIG. 5, which illustrates an example of processing multi-speaker speech data using a modified neural transducer, such as the factorized neural transducer of FIG. 4.

As shown in FIG. 5, input 502 includes the same token sequence as illustrated in FIG. 3B, namely: <hello> <how> <are> <cc> <i> <am> <cc> <you> <fine> <thank> <cc> <good> <cc> <you>. As in FIGS. 3A-3B, the bold tokens represent speech from a first speaker, the italicized tokens represent speech from a second speaker, and the underlined tokens represent speech from a third speaker.

As shown in FIG. 5, a first hidden state (e.g., hidden state 0) begins to process the first three tokens <hello> <how> <are> from the first speaker and generates the corresponding output. Notably, when the vocabulary predictor recognizes the <cc> or channel change token, the subsequent tokens are processed using the second hidden state (e.g., hidden state 1). Thus, the next two tokens <i> <am> are processed using the second hidden state in order to generate the corresponding output for the second speaker.

The next token in input 502 is a channel change token: <cc>, such that <you> is processed using the first hidden state. Notably, when <you> is processed using the first hidden state, the previous token(s) processed using the first hidden state is/are used as the basis for generating the output for <you>. In this manner, the output for <you> is correctly predicted based on previous tokens corresponding to the same speaker (e.g., the first speaker) using the first hidden state. This is in contrast to the process illustrated in FIG. 3B, where <you>, which corresponds to the first speaker, was processed based on tokens from the second speaker because the same hidden state was used to process tokens from both the first speaker and second speaker.

The rest of the tokens in input 502 are processed in a similar manner, such that output 506 is generated based on tokens from different speakers being processed using different hidden states associated with the set of vocabulary predictor processing layers. It should be appreciated that, as shown in FIG. 5, the first hidden state processes tokens from the first speaker and the third speaker, while the second hidden state processes tokens from the second speaker. However, in some instances, a first hidden state processes tokens from a first speaker, a second hidden state processes tokens from a second speaker, and a third hidden state processes tokens from a third speaker. Alternatively, the first hidden state processes tokens from a first speaker and a third speaker, while the second hidden state processes tokens from a second speaker and a fourth speaker.

As shown, output 506 includes output categorized by each speaker, which can then be separated into different virtual channels and/or subsequent transcription data for live captioning of the audio stream.

Additionally, in training scenarios, because the grammatical structure of the different sentences spoken by the plurality of speakers is maintained, the vocabulary predictor can continue to be used as a language model and can be adapted using text-only adaptation.

Attention will now be directed to FIGS. 6A-6D, which illustrates a different example of processing multi-speaker speech data using the same process illustrated in FIG. 5. In this example, an audio sample (e.g., input speech data 600) comprises overlapping speech between Speaker 1 and Speaker 2 (e.g., Speaker 1: "hello" and Speaker 2: "hey").

Initially, a first portion of the audio sample is processed, whereby acoustic features 605A (e.g., Acoustic Features A) are extracted from the first portion of the audio sample ("hello"). These audio features are encoded by the encoder 606 to generate encoder output 607A (e.g., Encoder Output A).

At this stage, there are no previously generated outputs. So, a null input 601A is processed by the vocabulary predictor 602 and the non-vocabulary predictor 612. Based on the intermediary null output 613A and the encoder output 607A, the joint network 614 is used to generate a non-vocabulary token 616A comprising a null token. Then, based on the intermediary null output 603A, which is further processed by the Log-Softmax layer 604, and the encoder output 607A, which is further processed by the linear layer 608, a vocabulary token 610A (<hello>) is generated for the first portion of the input speech data 600.

Figure 6A:
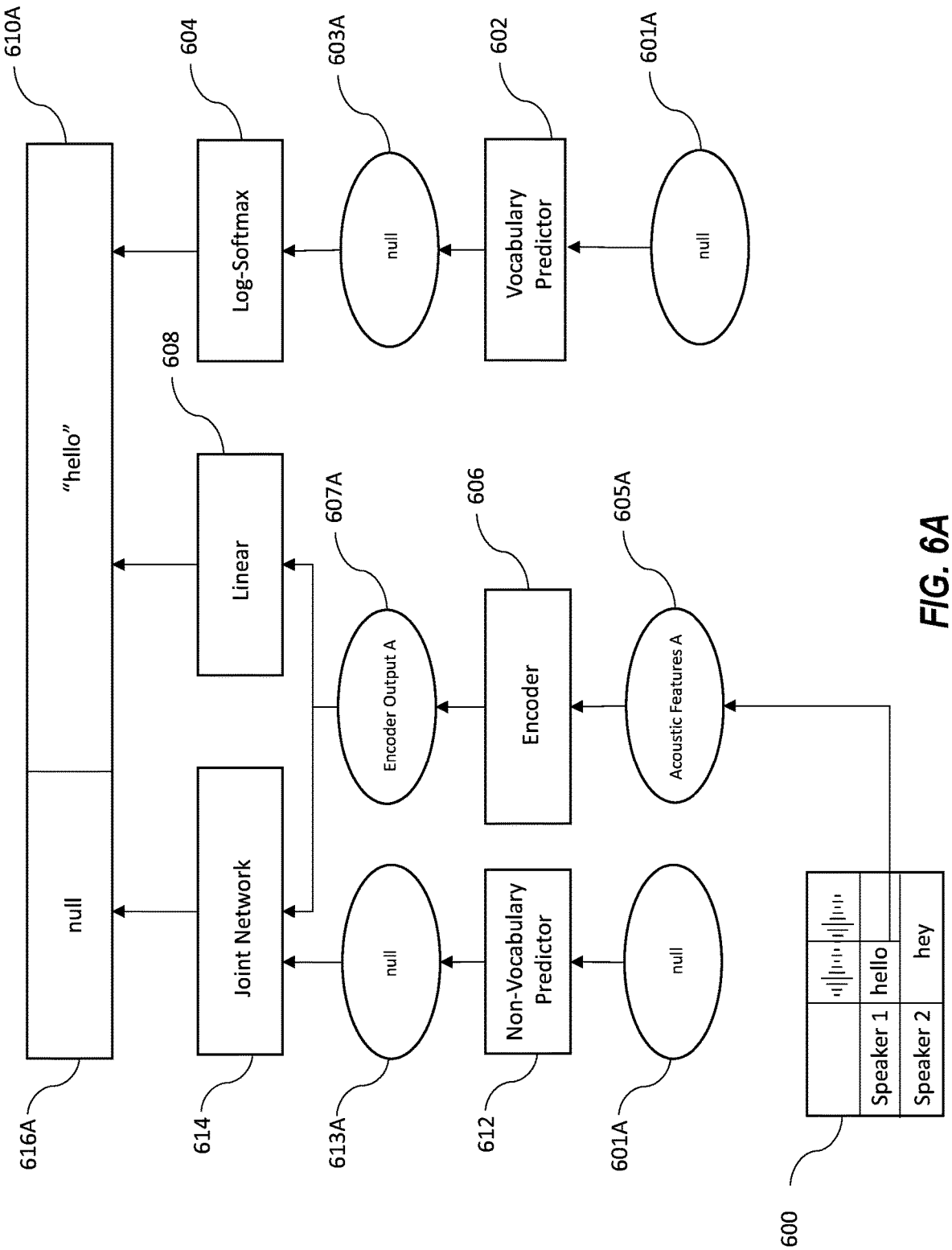
FIGS. 6A-6D illustrate an example of processing a sample of multi-speaker speech data using the process illustrated in FIG. 5.
Figure 6B:
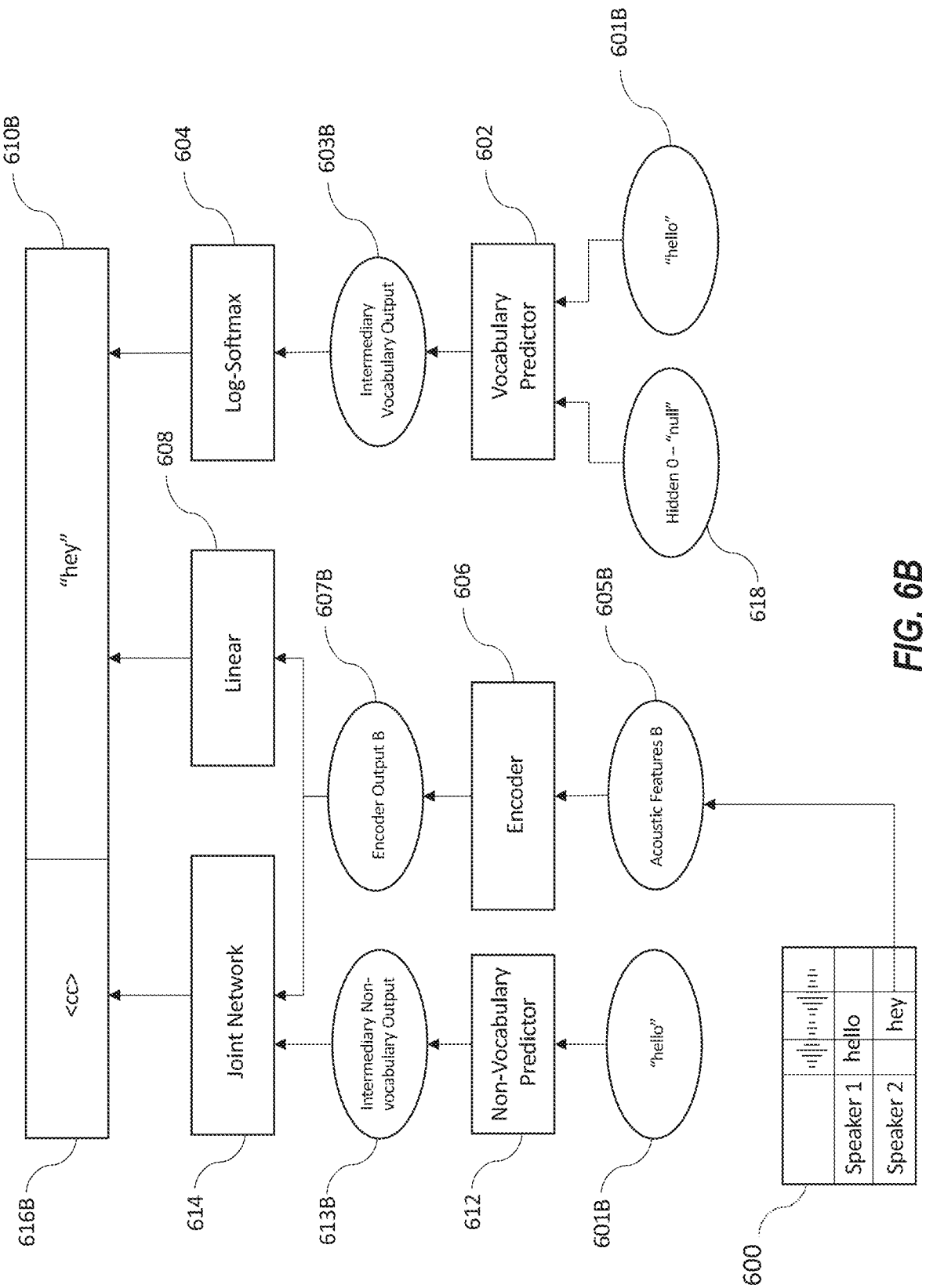

Attention will now be directed to FIG. 6B, which illustrates a second portion (i.e., the portion corresponding to "hey" spoken by Speaker 2) of the input speech data 600 being processed. For example, acoustic features 605B are extracted from the second portion of the input speech data and encoded by encoder 606 to generate encoder output 607B (e.g., Encoder Output B). The previously generated output (e.g., <null> <hello>) is processed as input to the vocabulary predictor 602 and the non-vocabulary predictor 612. Because no channel change token was included in the previous output, the previous vocabulary token <hello> is processed using the first hidden state of the vocabulary predictor 602 (i.e., "hidden 0-null" 618).

The vocabulary predictor 602 then generates intermediary vocabulary output 603B which is further processed by Log-Softmax layer 604. After the encoder output 607B is further processed by the linear layer 608, a new vocabulary token (e.g., vocabulary token 610B) comprising <hey> is generated for the second portion of the input speech data 600.

Additionally, the previous output 601B, (e.g., <hello>) is also processed as input to the non-vocabulary predictor 612 which generates intermediary non-vocabulary output 613B. The joint network 614 then processes encoder output 607B and intermediary non-vocabulary output 613B to predict a channel change token (e.g., non-vocabulary token 616B comprising <cc>), because a speaker change was detected for the second portion of the input speech data (i.e., the previous output 601B was associated with Speaker 1 and the second portion of the input speech data is associated with Speaker 2).

Figure 6C:
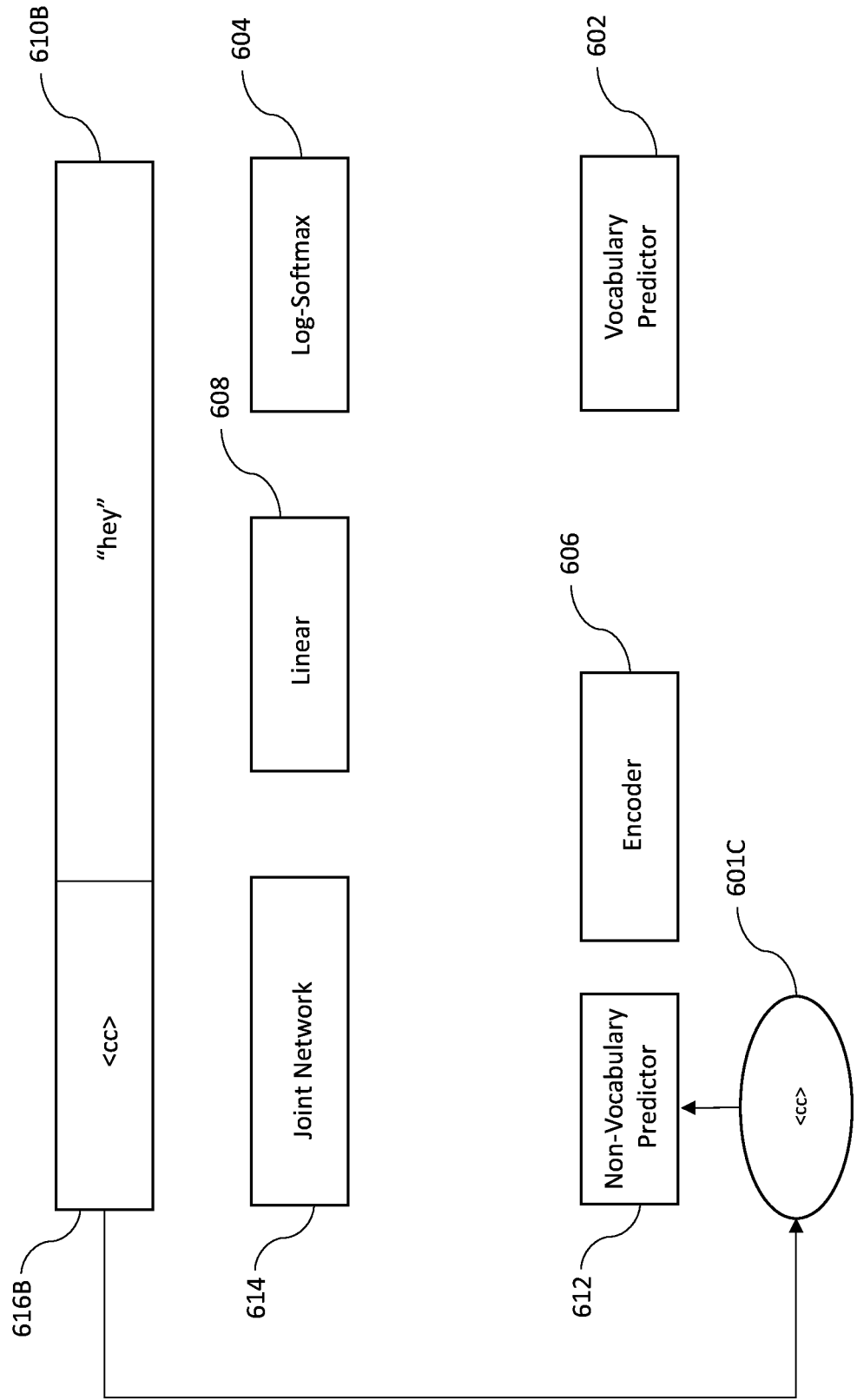

Attention will now be directed to FIG. 6C, which illustrates the previously generated non-vocabulary token (e.g., non-vocabulary token 616B) being processed as input to the non-vocabulary predictor 612. When the non-vocabulary predictor 612 receives previous output 601C and identifies a <cc> token within that input, the system outputs the previous output results.

Figure 6D:
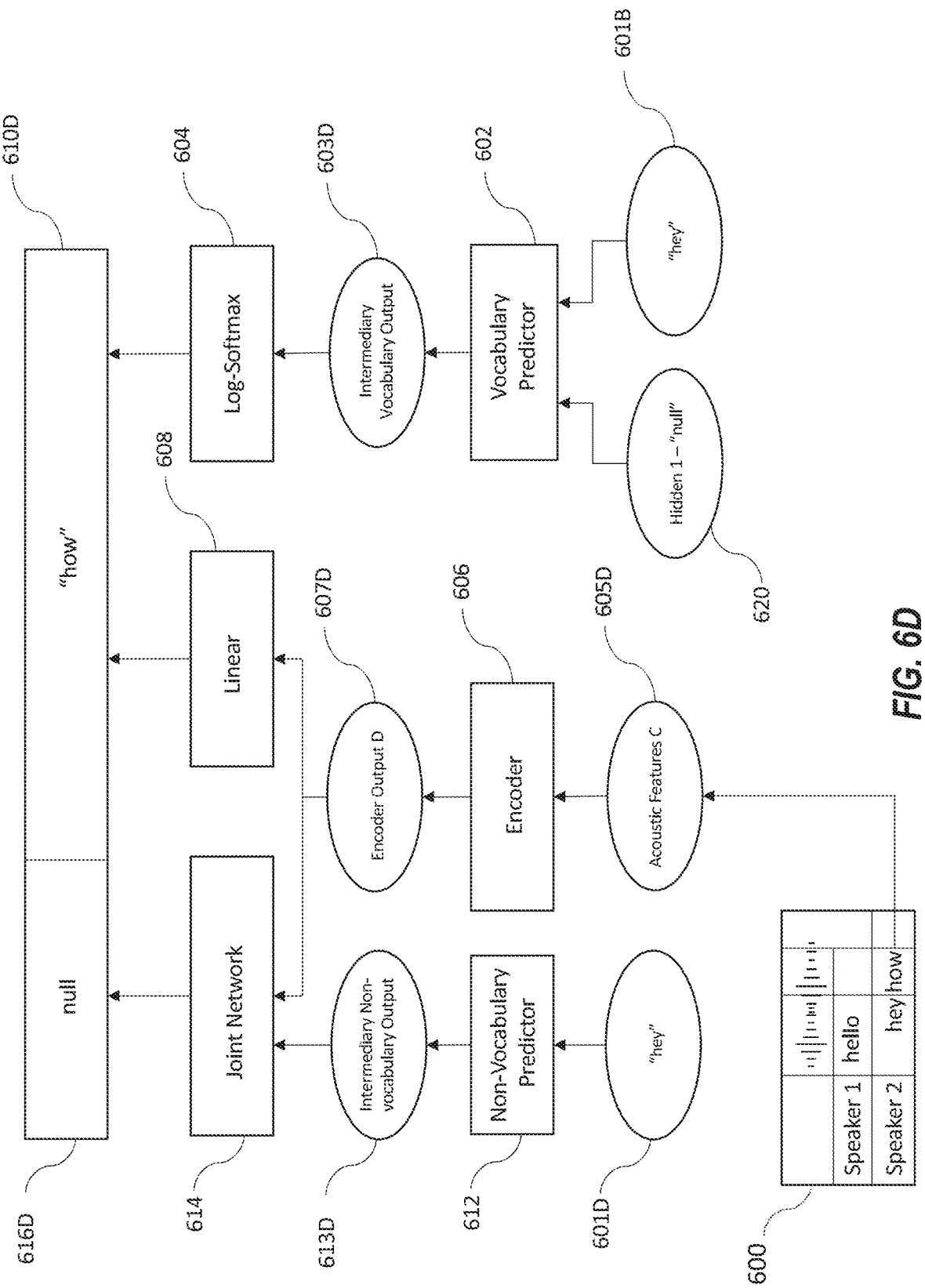

Attention will now be directed to FIG. 6D, which illustrates how the factorized neural transducer continues to process new portions of the input speech data 600 after having identified a channel change token. For example, a third portion (e.g., audio corresponding to "how" from Speaker 2) of the input speech data 600 is identified. Acoustic features 605D are extracted from the third portion of the input speech data 600. These acoustic features are then encoded (via encoder 606) to generate encoder output 607D (e.g., encoder output D).

Because the system previously generated an output comprising a <cc> token (e.g., non-vocabulary token 616B), the vocabulary predictor 602 processes the previous output (e.g., "hidden 1—null" 620 and outputs the previously generated vocabulary predictor output. The vocabulary predictor 602 also processes the previously generated vocabulary token (e.g., vocabulary token 610B) (<hey>) at the second hidden state to generate intermediary vocabulary output 603D. This intermediary output is then further processed using Log-Softmax layer 604. The encoder output 607D is further processed by linear layer 608. Based on the combination of the output of the linear layer 608 and the output of the Log-Softmax layer 604, a new vocabulary token (e.g., vocabulary token 610D) is generated comprising <how>, which represents the language recognized in the third portion of the input speech data 600.

The previously generated vocabulary token (e.g., vocabulary token 610B) is also processed by the non-vocabulary predictor 612 to generate intermediary non-vocabulary output 613D. The joint network 614 then processes the intermediary non-vocabulary output 613D and the encoder output 607D in order to predict a null token 616D. The null token is predicted because no speaker change was detected between the previously generated vocabulary token or previous output 601D corresponding to the second portion of the input speech data 600 and the acoustic features 605D corresponding to the third portion of the input speech data 600. As the input speech data continues to be processed, the vocabulary predictor 602 can switch back and forth between processing different portions of the input speech data at either hidden state of the vocabulary predictor 602 based on identifying any speaker changes in the input speech data 600.

Figure 7:
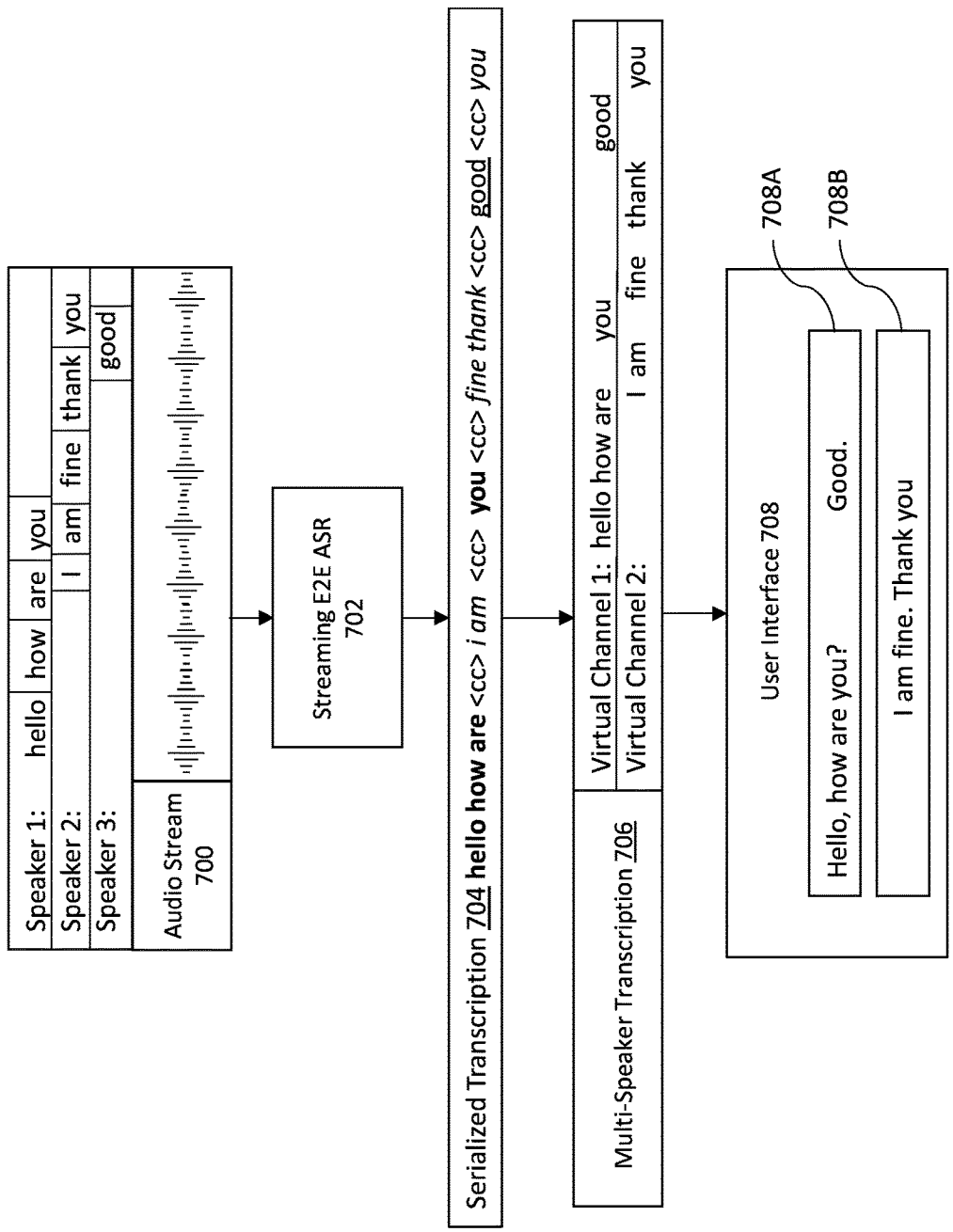
FIG. 7 illustrates an example of a process flow diagram for processing a multi-speaker audio stream and displaying multi-speaker transcription data based on the multi-speaker audio stream.

Attention will now be directed to FIG. 7, which illustrates an example of a process flow diagram for processing a multi-speaker audio stream and displaying multi-speaker transcription data based on the multi-speaker audio stream. For example, audio stream 700 comprises speech from multiple speakers (e.g., Speaker 1, Speaker 2, and Speaker 3). Speaker 1 speaks: "Hello, how are you?"; Speaker 2 speaks: "I am fine, thank you."; and Speaker 3 speaks: "good".

The audio stream 700 comprises speech from different speakers that overlap. For example, Speaker 2 begins speaking "I am" while Speaker 1 is finishing their greeting (i.e., "I am" overlaps with "are you"). Additionally, "good" from Speaker 3 overlaps with "thank you" from Speaker 2. In the illustrated example, audio stream 700 is received as a continuous audio input to the Streaming E2E ASR system 702. Notably, Streaming E2E ASR system 702 is representative of the factorized neural transducer of FIG. 4, wherein the audio stream 700 is processed in a similar manner as illustrated in FIG. 5. And FIGS. 6A-6D.

As the audio stream 700 is processed by Streaming E2E ASR system 702, a serialized transcription 704 is generated, including vocabulary tokens and non-vocabulary tokens. For example, serialized transcription 704 comprises: <hello> <how> <are> <cc> <I> <am> <cc> <you> <cc> <fine> <thank> <cc> <good> <cc> <you>. A <cc> token was generated every time the non-vocabulary predictor of the Streaming E2E ASR system 702 detected a speaker change between portions of the audio stream 700.

The serialized transcription 704 is then deserialized and separated into different virtual channels (e.g., virtual channel 1 and virtual channel 2) as part of a multi-speaker transcription 706. Initially, the "Hello how are" tokens are routed to virtual channel 1. Then, a <cc> token is then detected so that the following tokens "I am" are routed to virtual channel 2. Another detected <cc> token routes "you" back to the virtual channel 1. Then, the next <cc> token after "you" routes the next tokens "fine" and "thank" to virtual channel 2. Then <cc> token before "good" switches/triggers the routing of the next token(s) "good" back to the first virtual channel (e.g., virtual channel 1). Finally, the <cc> token after "good" triggers another routing switch for routing the final token "you" of the serialized transcription 704 back to virtual channel 2.

It should be noted that, in some instances, "good" may be routed to a third virtual channel (not illustrated) so that a first virtual channel (e.g., virtual channel 1) comprises speech from a first speaker (Speaker 1), a second virtual channel (e.g., virtual channel 2) comprises speech from a second speaker (Speaker 2), and a third virtual channel (not illustrated) comprises speech from a third speaker (Speaker 3). However, as shown in FIG. 7, virtual channel 1 comprises speech from Speaker 1 and Speaker 3, and virtual channel 2 comprises speech from Speaker 2. Depending on where the utterances from Speaker 3 are detected, it is also possible for tokens from Speaker 3 to be routed to virtual channel 1 and/or channel 2 at different portions of the serialized transcription.

The multi-speaker transcription 706, as illustrated by virtual channel 1 and virtual channel 2 can then be displayed at a user interface 708, such that transcription data included in virtual channel 1 is displayed at a first location of the user interface (e.g., window 708A) and transcription data included in virtual channel 2 is displayed at a second location of the user interface 708 (e.g., window 708B).

In some instances, where a third virtual channel exists, transcription data from a third speaker is displayed at a third location of the user interface 708, which is separate from the first and second locations used for the first and second speakers, (not depicted).

In some instances, the user interface is configured to display the transcription data from the different virtual channels as the serialized transcription is generated and subsequently deserialized in a streaming manner. In some instances, the transcription data from the different virtual channels is displayed at the user interface after the entire audio stream is processed and a final serialized transcription is generated and subsequently deserialized.

In instances where a virtual channel comprises speech from multiple speakers (e.g., virtual channel 1 comprises speech corresponding to Speaker 1 and Speaker 2), the user interface is configured to display speech from different speakers but included in the same virtual channel in a different format to help a user view which speech is from a different speaker, even when the transcription data from both speakers is displayed at the same location of the user interface.

Example Methods

Figure 8:
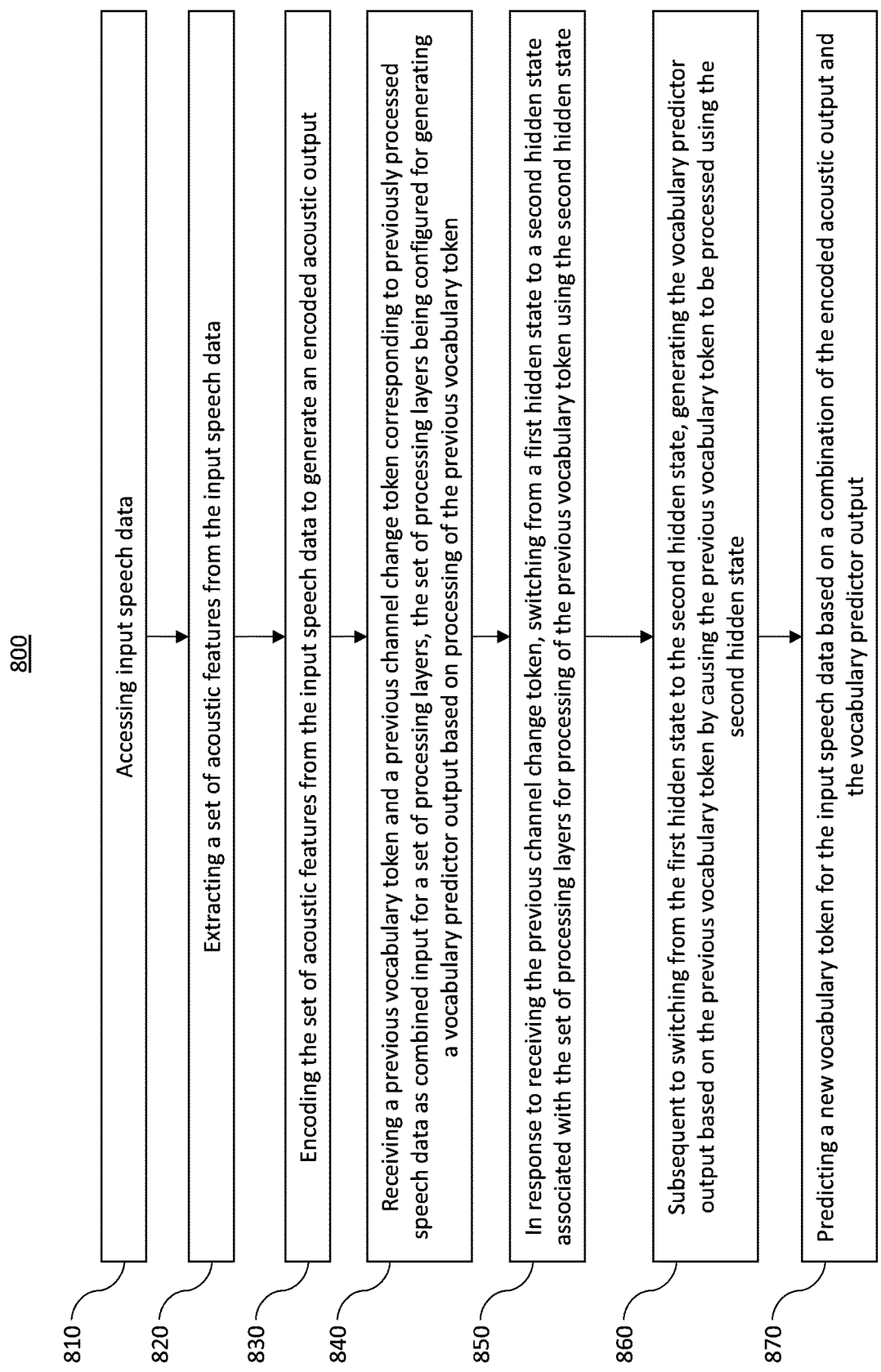
FIG. 8 illustrates one embodiment of a flow diagram having a plurality of acts associated with using a factorized neural transducer to perform multi-speaker automatic speech recognition.

Attention will now be directed to FIG. 8, which illustrates a flow diagram or method 800 that includes various acts (act 810, act 820, act 830, act 840, act 850, act 860, and act 870) associated with exemplary methods that can be implemented by computing system 1210 for using a factorized neural transducer to perform multi-speaker automatic speech recognition. The acts will be described below in reference to FIG. 1 and FIGS. 6A-6D.

As shown, the first illustrated act includes accessing input speech data (e.g., input speech data 600) (act 810). For clarity with regard to the following discussions, this speech data that is accessed may be referred to as a second portion of the input speech data 600.

The system extracts a set of acoustic features (e.g., acoustic features 605D) from this input speech data (e.g., the second portion of the input speech data 600) (act 820). After extracting the set of acoustic features, the set of acoustic features is encoded to generate an encoded acoustic output (e.g., encoder output 607D) (act 830).

The system also receives a previous vocabulary token (e.g., vocabulary token 610B represented by previous output 601D) and a previous channel change token (e.g., non-vocabulary token 616B represented by previous output 601C) corresponding to previously processed speech data (e.g., a first or preceding portion of the input speech data 600). These inputs are collectively provided as combined input for a set of processing layers (act 840) of the factorized neural transducer that is configured for generating a vocabulary predictor output (e.g., intermediary vocabulary output 603D) based on the processing of the previous vocabulary token (e.g., previous output 601D).

In response to receiving the previous channel change token (e.g., previous output 601C), the previous vocabulary token (e.g., previous output 601D) is processed using a second hidden state, instead of a first hidden state of the vocabulary predictor (e.g., vocabulary predictor 602) for processing the previous vocabulary token using the second hidden state (act 850).

After switching from a first hidden state to a second hidden state within the vocabulary predictor, the previous vocabulary token is processed using the second hidden state, wherein the system outputs the vocabulary predictor output (e.g., intermediary vocabulary output 603D) based on the previous vocabulary token, for example, by causing the previous vocabulary token to be processed using the second hidden state (act 860). In some instances, outputting the vocabulary predictor output comprises generating the vocabulary predictor output.

Finally, the system predicts a new vocabulary token (e.g., vocabulary token 610D; "how") for the input speech data (e.g., the third portion of the input speech data 600) based on a combination of the encoded acoustic output (e.g., encoder output 607D) and the vocabulary predictor output (e.g., intermediary vocabulary output 603D) (act 870).

Notably, the non-vocabulary predictor (e.g., non-vocabulary predictor 612) is configured to predict different kinds of non-vocabulary tokens, including blank tokens and channel change tokens. For example, if the system identifies a pause or a non-speech sound in the input speech data (e.g., input speech data 600), the system will predict a blank token for that portion of the input speech data. A blank token can also be predicted for a portion of the speech in which the speech was unrecognizable. The blank token is generated based on a combination of the encoded acoustic output and the non-vocabulary predictor output as processed by the joint network 614.

If the system identifies speaker change in the input speech data, a non-vocabulary token comprising a channel change token (e.g., non-vocabulary token 616B) is predicted based on a combination (e.g., joint network 614) of the encoded acoustic output (e.g., encoder output 607B)) and the non-vocabulary predictor output (e.g., intermediary non-vocabulary output 613B).

The following description of different method acts (not illustrated in FIG. 8) but associated with the method of FIG. 8 is further described in reference to FIG. 7. In some instances, a standard channel change token is predicted for any speaker change identified in the input speech data (e.g., <cc> tokens included in serialized transcription 704). However, in some instances, the channel change token further comprises speaker identification information indicating from which speaker the new input speech data is coming (e.g., <cc1> for Speaker 1, <cc2> for Speaker 2, <cc3> for Speaker 3, etc.). This may be particularly useful when there are more than two speakers, such that the input speech data is not switching back and forth between the same two speakers, but rather between three or more speakers. In this manner, the serialized transcript is more user-friendly and/or system-friendly when deserializing the serialized transcript into different virtual channels.

After the system generates a final output for a particular portion of input speech data (e.g., audio stream 700), the system appends the non-vocabulary token (e.g., <cc>) and the new vocabulary token (e.g., <you> to a serialized speech transcription (e.g., serialized transcription 704) of the input speech data (e.g., audio stream 700).

In some instances, method 800 also comprises an act for de-serializing the serialized speech transcription (e.g., serialized transcription 704) for the input speech data (e.g., audio stream 700). This de-serializing can be performed, for example, by routing a first set of serialized transcription portions (e.g., portions corresponding to Speaker 1 and Speaker 3) that were processed using the first hidden state to a first virtual channel (e.g., virtual channel 1) and routing a second set of serialized transcription portions (e.g., portions corresponding to Speaker 2) that were processed using the second hidden state to a second virtual channel (e.g., virtual channel 2).

It will be appreciated that the set of processing layers and the different virtual channels of the vocabulary predictor can be configured in a variety of different configurations to process different portions of the serialized transcriptions corresponding to different speakers. In one configuration, for example, a first hidden state of the set of processing layers is used to process speech in the input speech data from a first speaker, and a second hidden state of the set of processing layers is used to process speech in the input speech data from a second speaker, such that the first virtual channel comprises speech transcription data from the first speaker and the second virtual channel comprises speech transcription data from the second speaker.

In some instances, the first hidden state is also used to process speech in the input speech data from a third speaker, in addition to the first speaker, such that the first virtual channel also comprises speech transcription data from the third speaker.

Alternatively, an additional hidden state (e.g., a third hidden state, fourth hidden state, etc.) is provided by the vocabulary predictor for processing speech from the third speaker, such that the portions of the serialized speech transcription corresponding to the third speaker are routed to a third virtual channel of the vocabulary predictor.

In some instances, method 800 further comprises an act for displaying the first virtual channel (e.g., virtual channel 1) at a first location (e.g., window 708A) of a user interface (e.g., user interface 708) and the second virtual channel (e.g., virtual channel 2) at a second location (e.g., window 708B) of a user interface (e.g., user interface 708).

Figure 9:
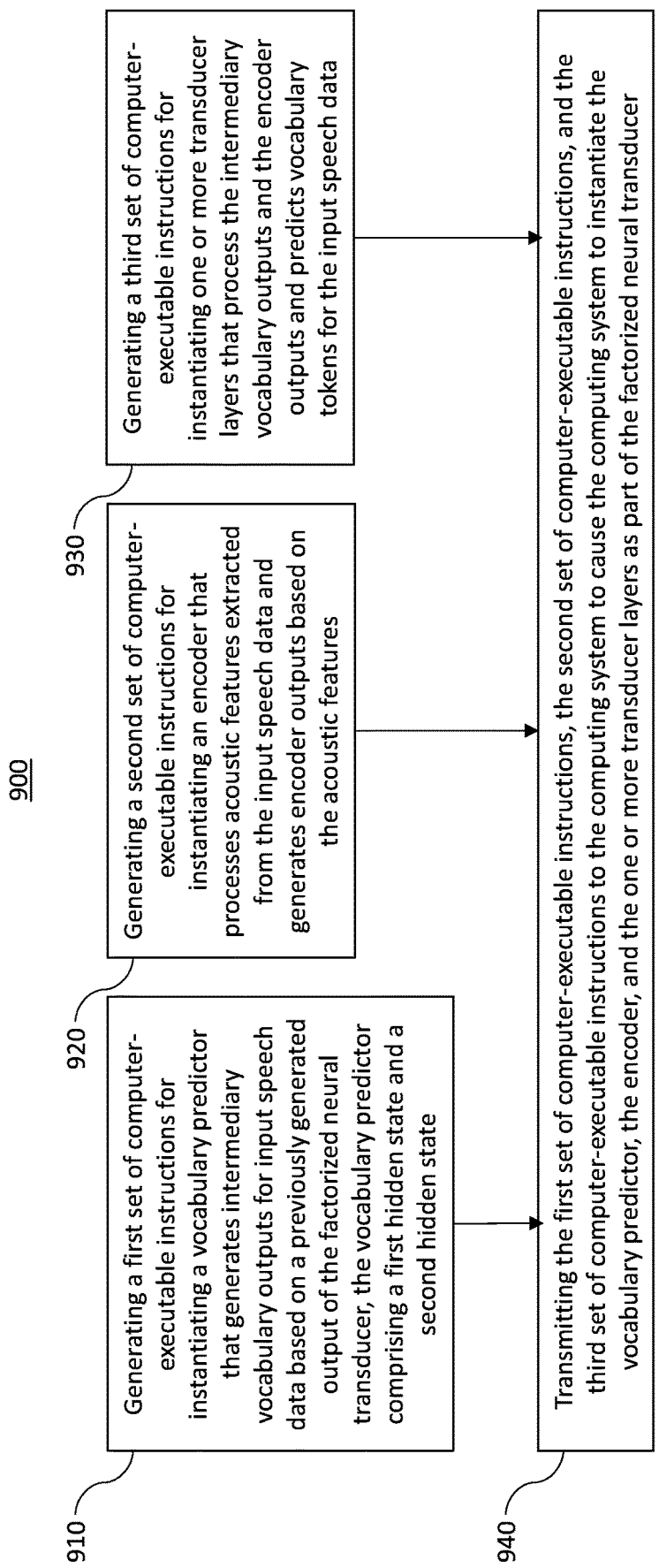
FIG. 9 illustrates one embodiment of a flow diagram having a plurality of acts associated with instantiating a factorized neural transducer.

Attention will now be directed to FIG. 9, which illustrates one embodiment of a flow diagram having a plurality of acts (e.g., act 910, act 920, act 930, and act 940) associated with a method 900 implemented by a computing system (e.g., computing system 1210) for instantiating a factorized neural transducer. The first illustrated act includes providing or generating a first set of computer-executable instructions for instantiating a vocabulary predictor (act 910). The vocabulary predictor is configured to generate intermediary vocabulary outputs for input speech data based on a previously generated output of the factorized neural transducer.

Notably, the vocabulary predictor comprises a set of processing layers having multiple hidden states (e.g., a first hidden state and a second hidden state). By instantiating a vocabulary predictor comprising a plurality of hidden states, the vocabulary predictor is able to be adapted to new domains using text-only multi-speaker transcription data as well as achieve improved accuracy in recognizing overlapping speech between different speakers in the same audio stream.

A second illustrated act includes providing or generating a second set of computer-executable instructions for instantiating an encoder that processes acoustic features extracted from the input speech data and generates encoder outputs based on the acoustic features (act 920). By encoding the acoustic features, the system is able to combine the encoder output and the non-vocabulary predictor output in the same representational space in order to predict the non-vocabulary tokens.

A third illustrated act includes providing or generating a third set of computer-executable instructions for instantiating one or more transducer layers that process the intermediary vocabulary outputs and the encoder outputs and predicts vocabulary tokens for the input speech data (act 930). By implementing methods in this manner, systems are able to achieve improved vocabulary token prediction by converting the outputs to the same representation space to better predict the vocabulary tokens for the current input speech data being processed.

A fourth illustrated act is provided for transmitting the first set of computer-executable instructions, the second set of computer-executable instructions, and the third set of computer-executable instructions to the computing system to cause the computing system to instantiate the vocabulary predictor, the encoder, and the one or more transducer layers as part of the factorized neural transducer (act 940).

In some instances, the referenced one or more transducer layers comprise a linear layer that processes the encoder outputs prior to being used in combination with the vocabulary predictor output in order to predict the vocabulary token. Additionally, or alternatively, the one or more transducer layers comprise a Log-Softmax layer that processes intermediary vocabulary outputs prior to being combined with encoder outputs or linearized encoder outputs to predict the vocabulary token.

It should be appreciated that, in some instances, the previously generated output of the factorized neural transducer comprises non-blank tokens. For example, the non-blank tokens comprise vocabulary tokens and channel change tokens.

In addition to predicting vocabulary tokens, the factorized neural transducer can only be instantiated to predict non-vocabulary tokens, including blank tokens and channel change tokens. For example, in some instances, method 900 further comprises an act for generating a third set of computer-executable instructions for instantiating a non-vocabulary predictor that generates intermediary non-vocabulary outputs based on the previously generated output of the factorized neural transducer and an act for generating a fourth set of computer-executable instructions for instantiating a joint network that predicts non-vocabulary tokens based on a combination of the intermediary non-vocabulary outputs and the encoder outputs.

Subsequent to generating the additional sets of instructions, the system then transmits the third set of computer-executable instructions and the fourth set of computer-executable instructions to cause the computing system to instantiate the non-vocabulary predictor and the joint network as part of the factorized neural transducer. By implementing methods in this manner, a discrete set of layers of the factorized neural transducer is now configured to predict non-vocabulary tokens, including channel change tokens which indicate speaker changes in input speech data.

The channel change tokens provide the technical benefit during the run-time of generating a serialized transcription, which can then be deserialized into different virtual channels corresponding to different speakers associated with the input speech data. Additional technical benefits are achieved during training and adaptation, such that as the channel change tokens are consumed as input in subsequent iteration steps, the factorized neural transducer is able to use text-only multi-speaker training data to adapt the vocabulary predictor to new domains.

Figure 10:
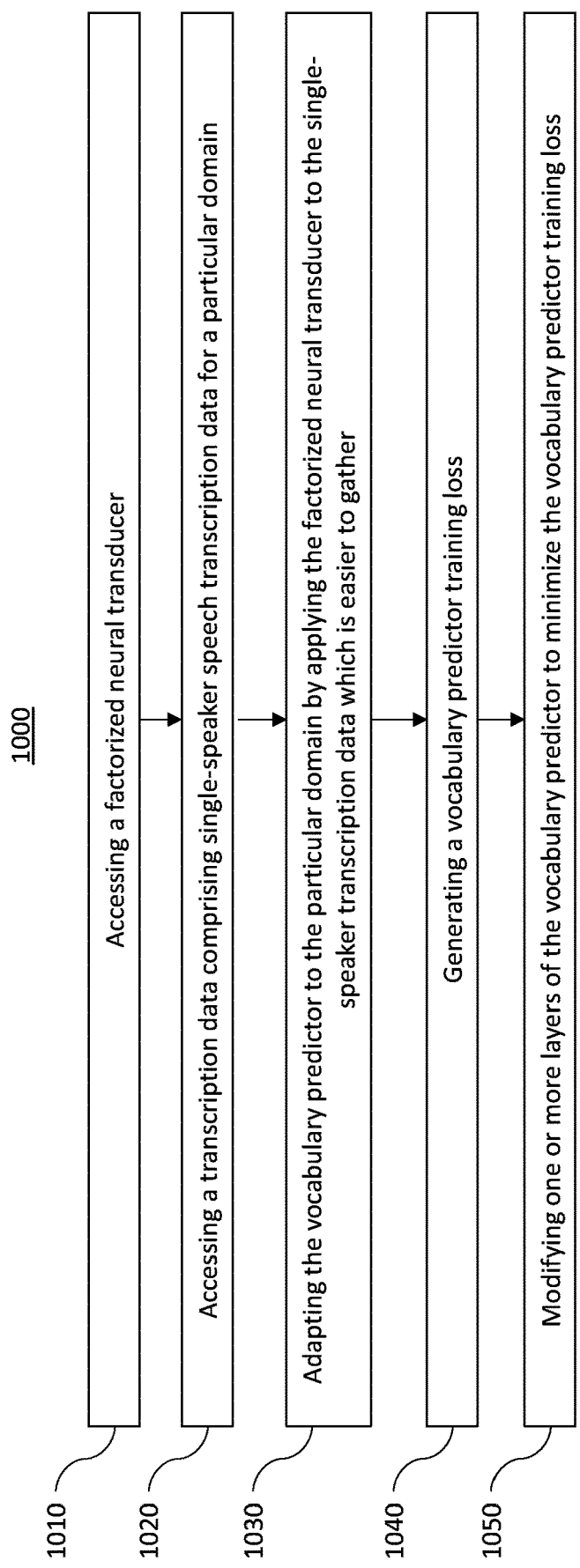
FIG. 10 illustrates one embodiment of a flow diagram having a plurality of acts associated with adapting a multi-speaker factorized neural transducer to a new domain.
Figure 11:
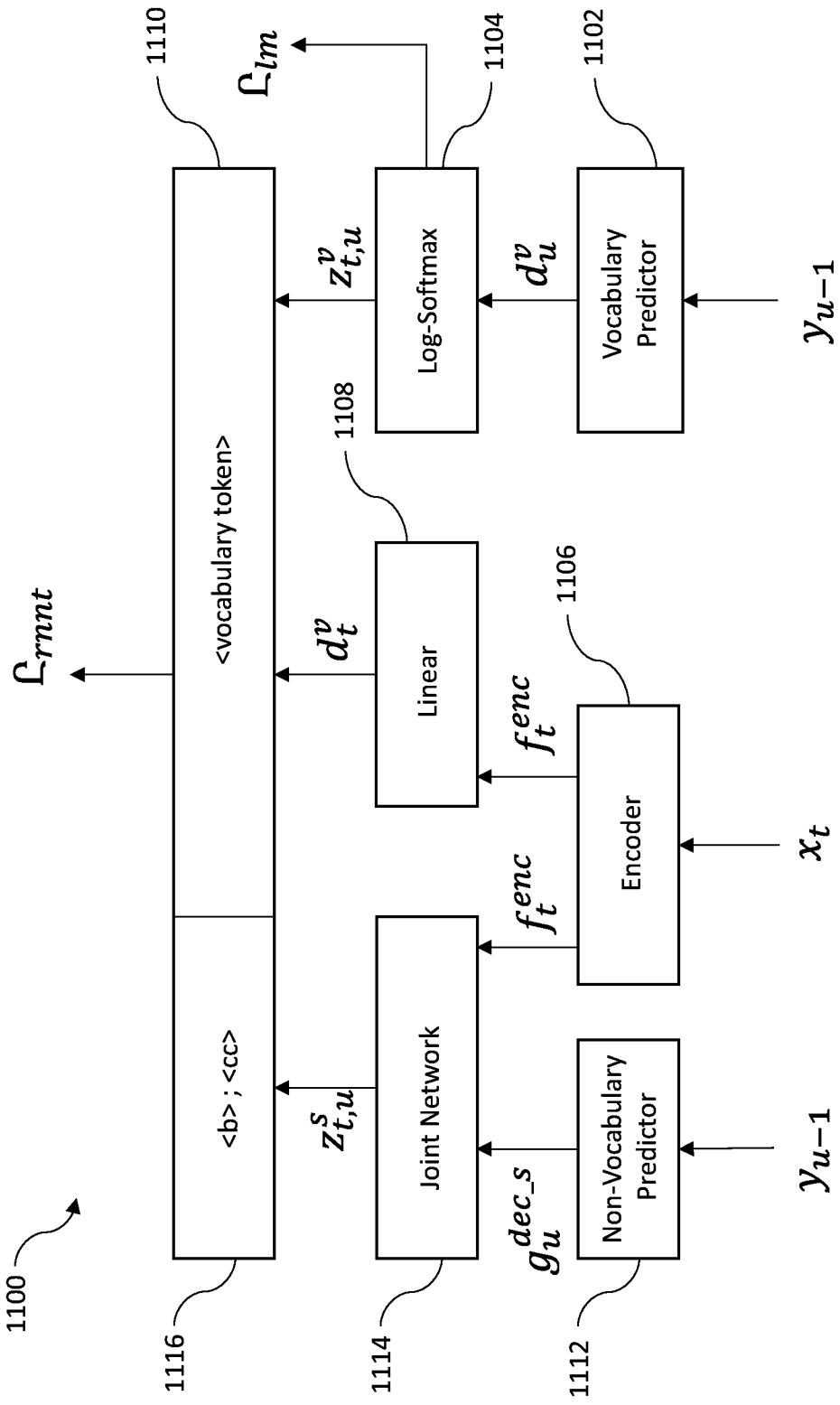
FIG. 11 illustrates an example process flow diagram of adapting a multi-speaker factorized transducer to a new domain.

Attention will now be directed to FIG. 10, which illustrates one embodiment of a flow diagram having a plurality of acts (e.g., act 1010, act 1020, act 1030, and act 1040) associated with a method 1000 implemented by computing system 1210 for adapting a multi-speaker factorized neural transducer to a new domain. The acts will be described in reference to FIG. 11, in addition to other figures described herein. For example, FIG. 11 illustrates an example process flow diagram of adapting a factorized neural transducer 1100 (representative of factorized neural transducer 400 of FIG. 4) to new domains.

The first illustrated act is provided for accessing a factorized neural transducer (e.g., factorized neural transducer 1100) (act 1010). In some instances, the factorized neural transducer comprises a vocabulary predictor (e.g., vocabulary predictor 1102). In some instances, the factorized neural transducer comprises an encoder (e.g., encoder 1106) and a non-vocabulary predictor (e.g., non-vocabulary predictor 1112) in addition to the vocabulary predictor.

The vocabulary predictor is configured to generate intermediary vocabulary outputs (e.g., $d_u^v$) for input speech data based on a previously generated output (e.g., $y_{u-1}$) of the factorized neural transducer. The vocabulary predictor further comprises a first hidden state and a second hidden state. The different hidden states are provided for processing different portions of audio data received as input to the factorized neural transducer. The vocabulary predictor switches between processing the audio data using the different hidden states based on identifying speaker changes within the audio data.

The encoder is configured to process acoustic features (e.g., $x_t$) from the input speech data and generate an encoder output (e.g., $f_t^{enc}$), wherein the factorized neural transducer predicts vocabulary tokens (e.g., vocabulary token 1110) based on a combination of the intermediary vocabulary outputs and the encoder outputs. In some instances, the intermediary vocabulary outputs are further processed using an additional hidden state (e.g., Log-Softmax Layer 1104) and the encoder outputs are further processed by a linear layer 1108 prior to being used to predict the vocabulary tokens.

Additionally, the non-vocabulary predictor is configured to generate intermediary non-vocabulary output (e.g., $g_u^{dec\_s}$), wherein the factorized neural transducer predicts non-vocabulary tokens (e.g., non-vocabulary tokens 1116), including channel change tokens (i.e., <cc>) and blank tokens (i.e., <b>), based on a combination of intermediary non-vocabulary outputs and the encoder outputs.

By factorizing the blank prediction network and the vocabulary prediction network, the vocabulary prediction network (e.g., the second set of layers) is able to behave like a standalone language model, which can be modified and/or adapted without having to modify or adapt the blank prediction network. This allows for greater flexibility and variety in the way the vocabulary prediction network can be modified and/or adapted. For example, the vocabulary prediction network can be adapted to a new domain using text-only data, as opposed to needing audio-text pairs. This also allows for text-only adaptation techniques which do not require modifying the non-vocabulary predictor.

In some instances, the intermediary non-vocabulary outputs and encoder outputs are further processed using a joint network (e.g., joint network 1114). The joint network output (e.g., $z_{t,u}^s$) is then used to predict the non-vocabulary tokens.

A second illustrated act is provided for accessing serialized transcription data comprising overlapping speech transcription data from multiple speakers for a particular domain (act 1020). A third illustrated act is provided for adapting the vocabulary predictor to the particular domain by applying the factorized neural transducer (e.g., factorized neural transducer 1100) to the serialized transcription data such that a first set of portions of the serialized transcription data are processed using the first hidden state of the vocabulary predictor and a second set of portions are processed using a second hidden state of the vocabulary predictor based on identifying one or more channel change tokens included in the serialized transcription data (act 1030). Some embodiments are directed to accessing single-speaker transcription data for a particular domain. In such embodiments, the vocabulary predictor is adapted to the particular domain by applying the factorized neural transducer (e.g., factorized neural transducer 1100) to the single-speaker transcription data.

Additional acts can be included in method 1000, for example, and as illustrated in FIG. 11, generating a vocabulary predictor training loss (e.g., $\mathcal{L}_{lm}$) (act 1040) and modifying one or more layers of the vocabulary predictor to minimize the vocabulary predictor training loss (act 1050).

Thus, in some instances, systems train or adapt only the vocabulary predictor, without having to modify any other layers of the factorized neural transducer. Alternatively, systems are configured to train or adapt one or more additional layers of the factorized neural transducer. For example, in some instances, in addition to generating a vocabulary predictor training loss, systems are also configured to generate a factorized neural transducer training loss (e.g., $\mathcal{L}_{rnnt}$), such that systems can also modify one or more layers of the factorized neural transducer (e.g., layers corresponding to the vocabulary predictor, encoder, non-vocabulary predictor, and/or other layers) to minimize the factorized neural transducer training loss to improve the overall accuracy of the factorized neural transducer in performing automatic speech recognition.

In some instances, the training data for adapting the factorized neural transducer, or more particularly, the vocabulary predictor of the factorized neural transducer, comprises single-speaker transcription data, without any channel change tokens. Notably, non-serialized single-speaker transcription data is more readily available and accessible than other types of training data (e.g., multi-speaker and/or serialized speech transcription data). Thus, by implementing systems according to the embodiments described herein, allows the systems to train and adapt the factorized neural transducer for a particular domain and improve the accuracy of both single-speaker and multi-speaker speech recognition with using, in some instances, only single-speaker training data.

The training data for adapting the factorized neural transducer, or more particularly, the vocabulary predictor of the factorized neural transducer, comprises the serialized transcription data. For example, in some instances, the serialized transcription data comprises a plurality of change channel tokens corresponding to speaker changes between multiple speakers of speech transcribed in the serialized transcription data. The serialized transcription can be generated automatically or manually.

In instances where the serialized transcription is generated manually, the systems obtain or access the serialized transcription data by accessing different sets of single-speaker transcription data from multiple speakers, interweaving portions of the different sets of single-speaker transcription data to generate a multi-speaker transcription dataset, and inserting a channel change token between portions of the multi-speaker transcription dataset that correspond to different speakers of the multiple speakers. In this manner, systems do not have to directly obtain multi-speaker speech data which can be difficult to obtain. Instead, systems are able to convert single-speaker data into multi-speaker data to be used for training and/or adapting the factorized neural transducer to a new domain.

In some instances, prior to a meeting between different participants concerning a particular topic, systems can access various documents, previous conversations, emails, and other text data containing keywords that will be used and spoken during the meeting. By converting the access text data, systems can curate the text data to adapt the factorized neural transducer to the particular topic of the meeting. This can significantly improve the accuracy of the factorized neural transducer in recognizing those keywords during the meeting, especially during any overlapped speech from multiple meeting participants.

The computing system can also detect various attributes of the context of the training data in order to determine and select a particular adaptation technique from a plurality of adaptation techniques. For example, if the system detects new adaptation data in the input text, the system may obtain further adaptation on the language model. However, if time is limited for the adaptation process, the system may implement an N-gram model, as described below, during run-time. In some instances, where the input text comprises both new adaptation terms within the baseline domain language, the system can implement a KL divergence function to prevent baseline knowledge loss during adaptation. If there is limited time to adapt the transducer, the system can implement an N-gram model with a gating network to guide how to combine knowledge from the baseline language model and the adapted N-gram model.

In view of the foregoing, the disclosed embodiments are utilized to realize many technical benefits and advantages over conventional systems and methods for performing speech recognition, as well as for generating and modifying machine learning models that are capable of performing multi-speaker speech recognition. The technical benefits and advantages that may be realized, for example, include the ability to process overlapping speech from multiple speakers within the same audio stream. By implementing double hidden within the vocabulary predictor, the factorized neural transducer is able to be adapted to new domains using serialized transcriptions including overlapping speech from multiple speakers.

Example Computing Systems

Figure 12:
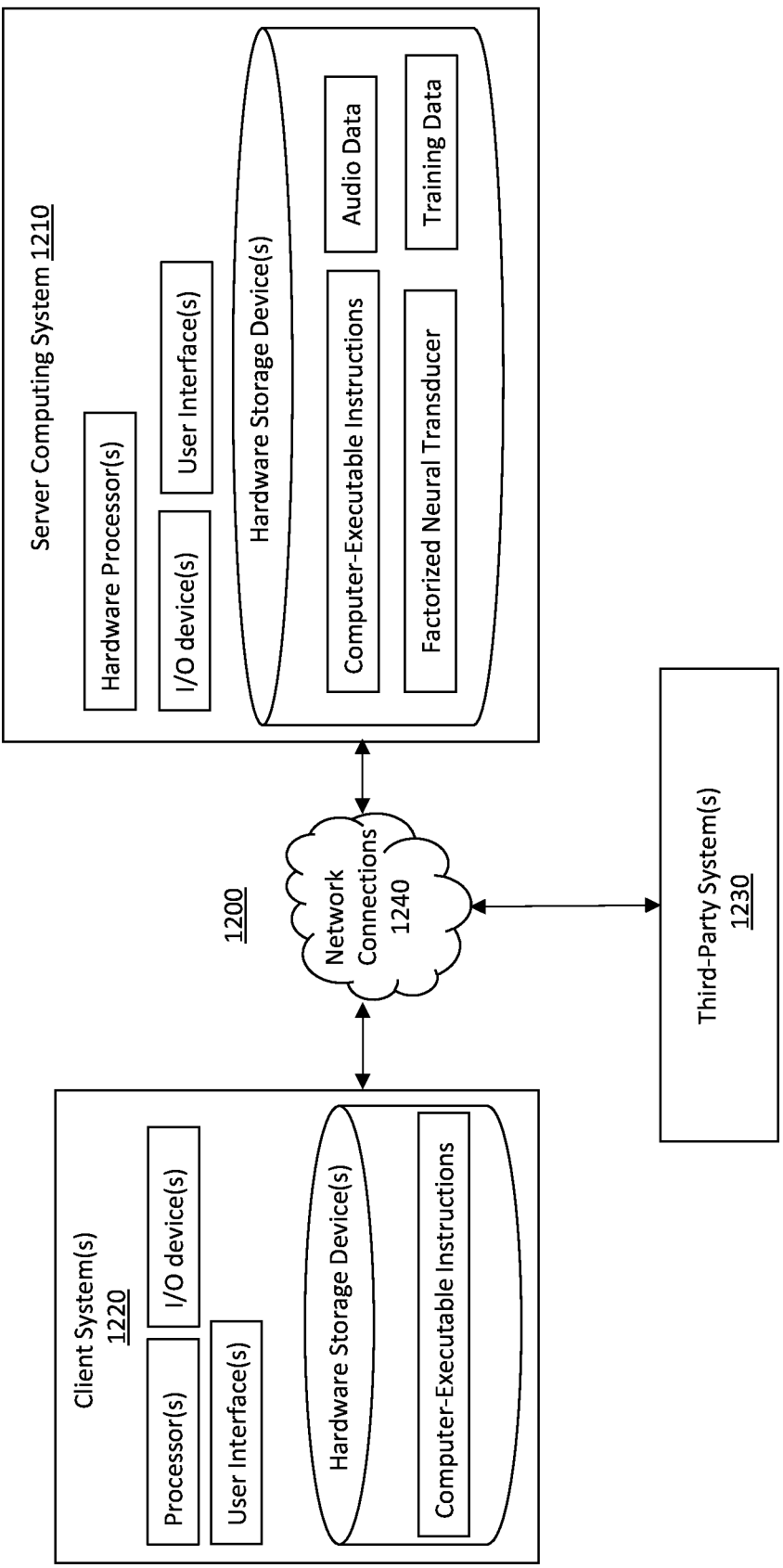
FIG. 12 illustrates an example computing environment in which a computing system incorporates and/or is utilized to perform disclosed aspects of the disclosed embodiments.

Attention will now be directed to FIG. 12, which illustrates the computing system 1210 as part of a computing environment 1200 that includes client system(s) 1220 and third-party system(s) 1230 in communication (via a network 1240) with the computing system 1210. As illustrated, computing system 1210 is a server computing system configured to compile, modify, and implement a factorized neural transducer (e.g., factorized neural transducer 400) configured to perform speech recognition on multi-speaker speech data, including overlapping speech from multiple speakers.

The computing system 1210, for example, includes one or more processor(s) (such as one or more hardware processor(s) and one or more hardware storage device(s) storing computer-readable instructions. One or more of the hardware storage device(s) is able to house any number of data types and any number of computer-executable instructions by which the computing system 1210 is configured to implement one or more aspects of the disclosed embodiments when the computer-executable instructions are executed by the one or more hardware processor(s). The computing system 1210 is also shown including user interface(s) and input/output (I/O) device(s).

As shown in FIG. 12, hardware storage device(s) are shown as a single storage unit. However, it will be appreciated that the hardware storage device(s) can also be a distributed storage that is distributed to several separate and sometimes remote systems and/or third-party system(s). The computing system 1210 can also comprise a distributed system with one or more of the components of computing system 1210 being maintained/run by different discrete systems that are remote from each other and that each system performs different tasks. In some instances, a plurality of distributed systems performs similar and/or shared tasks for implementing the disclosed functionality, such as in a distributed cloud environment.

In some instances, the audio data is natural language audio and/or synthesized audio data. Input audio data is retrieved from previously recorded files such as video recordings having audio or audio-only recordings. Some examples of recordings include videos, podcasts, voicemails, voice memos, songs, etc. Audio data is also retrieved from actively streaming content which is live continuous speech such as a news broadcast, phone call, virtual or in-person meeting, etc. In some instances, a previously recorded audio file is streamed. Natural audio data is recorded from a plurality of sources, including applications, meetings comprising one or more speakers, ambient environments including background noise and human speakers, etc. It should be appreciated that natural language audio comprises one or more spoken languages of the world's spoken languages. Thus, the factorized neural transducer is trainable in one or more languages.

The training data for the baseline factorized neural transducer comprises spoken language utterances (e.g., natural language and/or synthesized speech) and corresponding textual transcriptions (e.g., text data). The training data comprises text data and natural language audio and simulated audio that comprises speech utterances corresponding to words, phrases, and sentences included in the text data. In other words, the speech utterances are the ground truth output for the text data input. Training data also includes adaptation data which comprises text-only data for new domains on which factorized neural transducer can be adapted.

The computing system is in communication with client system(s) 1220 comprising one or more processor(s), one or more user interface(s), one or more I/O device(s), one or more sets of computer-executable instructions, and one or more hardware storage device(s). In some instances, users of a particular software application (e.g., Microsoft Teams) engage with the software at the client system which transmits the audio data to the server computing system to be processed, wherein the predicted labels are displayed to the user on a user interface at the client system. Alternatively, the server computing system is able to transmit instructions to the client system for generating and/or downloading a factorized neural transducer model, wherein the processing of the audio data by the model occurs at the client system.

The computing system is also in communication with third-party system(s) 1230. It is anticipated that, in some instances, the third-party system(s) 1230 further comprise databases housing data that could be used as training data, for example, text data not included in local storage. Additionally, or alternatively, the third-party system(s) 1230 includes machine learning systems external to the computing system 1210.

Embodiments of the present invention may comprise or utilize a special-purpose or general-purpose computer (e.g., computing system 1210) including computer hardware, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media (e.g., hardware storage device(s) of FIG. 12) that store computer-executable/computer-readable instructions are physical hardware storage media/devices that exclude transmission media. Computer-readable media that carry computer-executable instructions or computer-readable instructions in one or more carrier waves or signals are transmission media. Thus, by way of example, and not limitation, embodiments of the invention can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 1240 of FIG. 12) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry, or desired program code means in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing system for performing run-time automatic speech recognition, where the run-time automatic speech recognition involves processing overlapping speech from multiple speakers within a same audio stream using different hidden states, resulting in a more accurate transcription output for the multiple speakers as compared to output that utilizes only a single hidden state, the method comprising:

accessing input speech data included in an audio stream, wherein the input speech data includes speech data obtained from multiple speakers or multiple channels;

extracting a set of acoustic features from the input speech data;

encoding the set of acoustic features from the input speech data to generate an encoded acoustic output;

receiving a previous vocabulary token and a previous channel change token corresponding to previously processed speech data as combined input for a set of processing layers, the set of processing layers being configured for generating a vocabulary predictor output based on processing of the previous vocabulary token;

in response to receiving the previous channel change token, switching from a first hidden state to a second hidden state of the set of processing layers for processing of the previous vocabulary token using the second hidden state;

subsequent to switching from the first hidden state to the second hidden state, outputting the vocabulary predictor output based on the previous vocabulary token by causing the set of processing layers to process the previous vocabulary token using the second hidden state;

predicting a new vocabulary token for the input speech data based on a combination of the encoded acoustic output and the vocabulary predictor output;

modifying a serialized speech transcription of the input speech data by appending the new vocabulary token to the serialized speech transcription;

de-serializing the serialized speech transcription of the input speech data by routing tokens included in the serialized speech transcription to different virtual channels, wherein:
- a first set of tokens that were processed using the first hidden state are routed to a first virtual channel, the first set of tokens being associated with a first speaker included among said multiple speakers,
- a second set of tokens that were processed using the second hidden state are routed to a second virtual channel, the second set of tokens being associated with a second speaker included among said multiple speakers, and
- a combination of the first set of tokens and the second set of tokens constitutes a multi-speaker transcription; and displaying the multi-speaker transcription on a user interface, wherein a first portion of the user interface is caused to display the first set of tokens associated with the first virtual channel, and wherein a second portion of the user interface is caused to display the second set of tokens associated with the second virtual channel, and wherein a layout of the user interface is structured to temporally align the first set of tokens with the second set of tokens.

2. The method of claim 1, further comprising:
identifying a pause in the input speech data; and
predicting a non-vocabulary token comprising a blank token based on a combination of the encoded acoustic output and a non-vocabulary predictor output.

3. The method of claim 1, further comprising:
identifying a speaker change in the input speech data; and
predicting a non-vocabulary token comprising a channel change token based on a combination of the encoded acoustic output and a non-vocabulary predictor output.

4. The method of claim 3, wherein the channel change token further comprises speaker identification information.

5. The method of claim 3, further comprising:
appending the non-vocabulary token to the serialized speech transcription of the input speech data.

6. The method of claim 1, wherein the first hidden state processes speech in the input speech data from the first speaker, and the second hidden state processes speech in the input speech data from the second speaker, such that the first virtual channel comprises speech transcription data from the first speaker and the second virtual channel comprises speech transcription data from the second speaker.

7. The method of claim 6, wherein the first hidden state processes speech in the input speech data from a third speaker, in addition to the first speaker, such that the first virtual channel also comprises speech transcription data from the third speaker.

8. The method of claim 1, wherein an additional hidden state processes speech in the input speech data from a third speaker, such that a third set of portions of the serialized speech transcription is routed to a third virtual channel.

9. A computer system that performs run-time automatic speech recognition, where the run-time automatic speech recognition involves processing overlapping speech from multiple speakers within a same audio stream using different hidden states, resulting in a more accurate transcription output for the multiple speakers as compared to output that utilizes only a single hidden state, the computer system comprising:

one or more processors; and
one or more hardware storage devices that store instructions that are executable by the one or more processors to cause the computer system to:
- access input speech data included in an audio stream, wherein the input speech data includes speech data obtained from multiple speakers or multiple channels;
- extract a set of acoustic features from the input speech data;
- encode the set of acoustic features from the input speech data to generate an encoded acoustic output;
- receive a previous vocabulary token and a previous channel change token corresponding to previously processed speech data as combined input for a set of processing layers, the set of processing layers being configured for generating a vocabulary predictor output based on processing of the previous vocabulary token;
- in response to receiving the previous channel change token, switch from a first hidden state to a second hidden state of the set of processing layers for processing of the previous vocabulary token using the second hidden state;
- subsequent to switching from the first hidden state to the second hidden state, output the vocabulary predictor output based on the previous vocabulary token by causing the set of processing layers to process the previous vocabulary token using the second hidden state;
- predict a new vocabulary token for the input speech data based on a combination of the encoded acoustic output and the vocabulary predictor output;
- modify a serialized speech transcription of the input speech data by appending the new vocabulary token to the serialized speech transcription;
- de-serialize the serialized speech transcription of the input speech data by routing tokens included in the serialized speech transcription to different virtual channels, wherein:
  - a first set of tokens that were processed using the first hidden state are routed to a first virtual channel, the first set of tokens being associated with a first speaker included among said multiple speakers,
  - a second set of tokens that were processed using the second hidden state are routed to a second virtual channel, the second set of tokens being associated with a second speaker included among said multiple speakers, and
  - a combination of the first set of tokens and the second set of tokens constitutes a multi-speaker transcription; and
- display the multi-speaker transcription on a user interface, wherein a first portion of the user interface is caused to display the first set of tokens associated with the first virtual channel, and wherein a second portion of the user interface is caused to display the second set of tokens associated with the second virtual channel, and wherein a layout of the user interface is structured to temporally align the first set of tokens with the second set of tokens.

10. The computer system of claim 9, wherein a first token included in the first set of tokens is visually aligned with a second token included in the second set of tokens.

11. The computer system of claim 9, wherein a first token included in the first set of tokens is visually illustrated as occurring at a same time as a second token included in the second set of tokens.

12. The computer system of claim 9, wherein the multi-speaker transcription is displayed while the multi-speaker transcription is being generated.

13. The computer system of claim 9, wherein the multi-speaker transcription is displayed after the multi-speaker transcription is fully generated.

14. The computer system of claim 9, wherein the first set of tokens are displayed in a first format.

15. The computer system of claim 14, wherein the second set of tokens are displayed in a second format.

16. The computer system of claim 9, wherein the first and second sets of tokens are displayed differently.

17. The computer system of claim 9, wherein the user interface includes a field identifying the first virtual channel.

18. The computer system of claim 17, wherein the user interface includes a second field identifying the second virtual channel.

19. The computer system of claim 9, wherein the second set of tokens are displayed proximately to the first set of tokens.

\* \* \* \* \*